(12) United States Patent
Williams et al.

(10) Patent No.: US 11,531,913 B2
(45) Date of Patent: Dec. 20, 2022

(54) SYSTEMS FOR FAST AND/OR EFFICIENT PROCESSING OF DECISION NETWORKS, AND RELATED METHODS AND APPARATUS

(71) Applicant: Xandr Inc., New York, NY (US)

(72) Inventors: Catherine Mary Williams, New York, NY (US); Paul Khuong, New York, NY (US)

(73) Assignee: Xandr Inc., New York, NY (US)

( * ) Notice: Subject to any disclaimer, the term of this patent is extended or adjusted under 35 U.S.C. 154(b) by 705 days.

(21) Appl. No.: 16/526,587

(22) Filed: Jul. 30, 2019

(65) Prior Publication Data

US 2020/0050952 A1     Feb. 13, 2020

Related U.S. Application Data

(60) Provisional application No. 62/715,342, filed on Aug. 7, 2018.

(51) Int. Cl.
| | |
|---|---|
| *G06N 20/00* | (2019.01) |
| *G06N 3/02* | (2006.01) |
| *A61B 5/389* | (2021.01) |
| *G06N 5/04* | (2006.01) |
| *G06N 20/10* | (2019.01) |

(52) U.S. Cl.
CPC ............ *G06N 5/045* (2013.01); *G06N 20/10* (2019.01)

(58) Field of Classification Search
CPC ........ G06N 5/045; G06N 20/10; G06N 5/003; G06N 20/00

USPC ....................................................... 706/1–62
See application file for complete search history.

(56) References Cited

U.S. PATENT DOCUMENTS

| | | | | |
|---|---|---|---|---|
| 9,443,192 | B1* | 9/2016 | Cosic | G06N 5/048 |
| 2015/0109202 | A1* | 4/2015 | Ataee | A61B 5/681 |
| | | | | 345/156 |
| 2015/0379428 | A1* | 12/2015 | Dirac | G06N 20/00 |
| | | | | 706/12 |

* cited by examiner

*Primary Examiner* — Brandon S Cole

(57) ABSTRACT

Aspects of the subject disclosure may include, for example, a technique for processing a decision network that includes obtaining an index encoding a mapping from potential values of an input parameter to decision parameters of the network's predicates, wherein the mapping associates potential values of the input parameter with decision parameters affected by those potential values; evaluating decision parameters affected by specified values of the input parameter, including identifying each decision parameter to which the index maps at least one specified values of the input parameter, and setting the values of those decision parameters in accordance with the input parameter's specified values; and analyzing the decision network, including evaluating the predicates of one or more of the decision nodes based on the values of the predicates' decision parameters, and determining, based on the values of the evaluated predicates and a topology of the decision network, that a particular terminal node encodes the network's output. Other embodiments are disclosed.

20 Claims, 14 Drawing Sheets

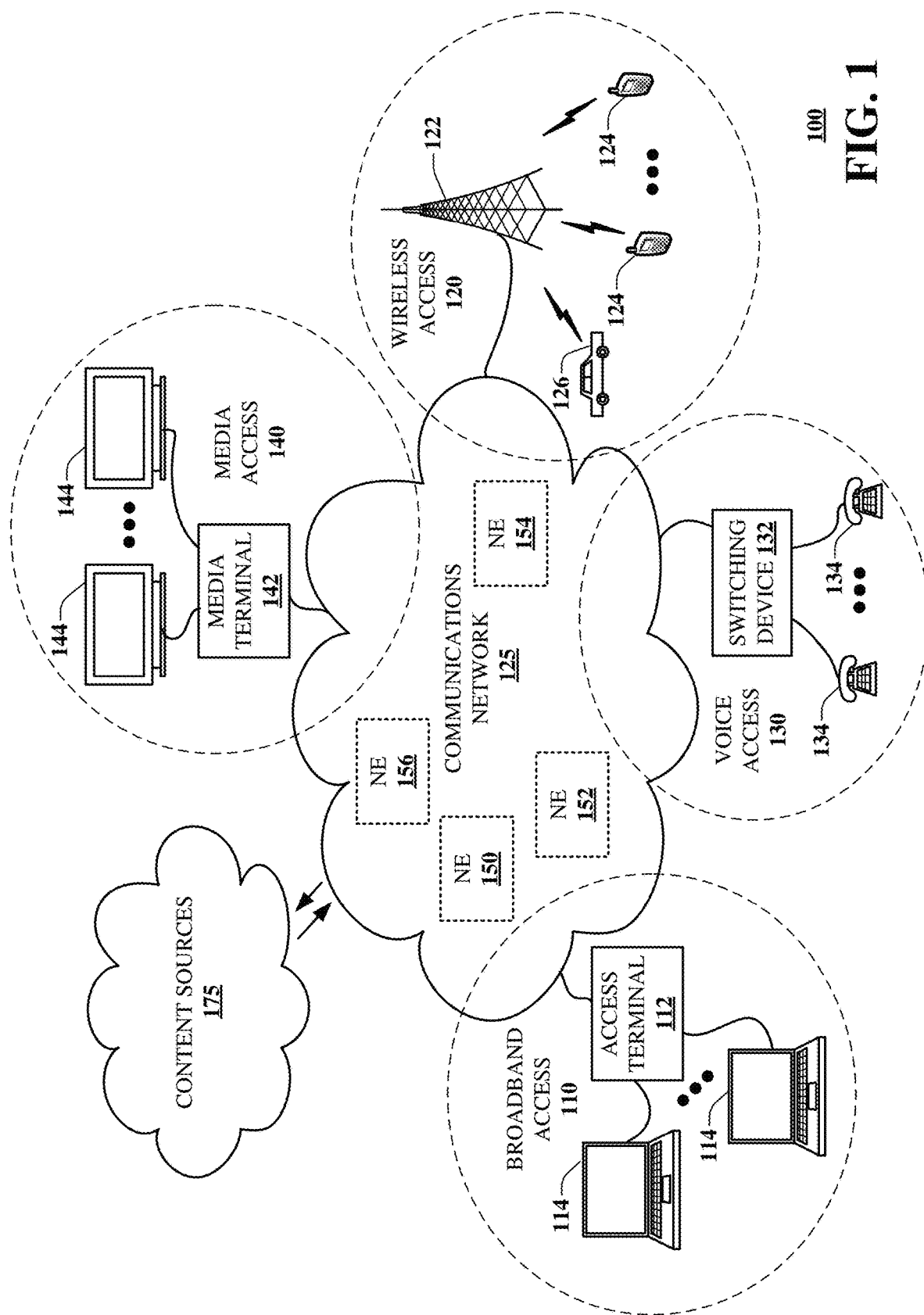

```
clean_clothes = { jeans, sweatshirt, sweater }
tests_today = { history }
events_tonight = { party, basketball_game }
weather = { warm, windy }
```
— 218

↓ 220

```
Node 201: (eval(jeans_clean) → TRUE) AND (eval(t-shirt_clean) → FALSE) : FALSE        — 221
Node 203: (eval(sweatshirt_clean) → TRUE) AND (eval(NOT warm) → FALSE) : FALSE        — 222
Node 205: (eval(party_tonight) → TRUE) AND
          (eval(NOT calculus_test_today) → TRUE) AND                                   — 223
          (eval(NOT physics_test_today) → TRUE)) : TRUE
Node 206: (eval(sweater_clean) → TRUE) : TRUE                                          — 224
Node 207: wear leggings and sweater                                                    — 225
```

FIG. 2B

```
clean_clothes = { jeans, t-shirt, sweater }
tests_today = { physics }
events_tonight = { party, basketball_game }
weather = { cool, windy }
```
— 230

↓ 240

```
Node 201: (eval(jeans_clean) → TRUE) AND (eval(t-shirt_clean) → TRUE) : TRUE
Node 203: (eval(sweatshirt_clean) → FALSE) AND (eval(NOT warm) → TRUE) : FALSE
Node 205: (eval(party_tonight) → TRUE) AND
          (eval(NOT calculus_test_today) → TRUE) AND                                   — 241
          (eval(NOT physics_test_today) → FALSE)) : FALSE
Node 206: (eval(sweater_clean) → TRUE) : TRUE
Node 201: TRUE                                                                         — 242
Node 202: wear jeans and t-shirt                                                       — 243
```

FIG. 2C

218 clean_clothes = { jeans, sweatshirt, sweater }
tests_today = { history }
events_tonight = { party, basketball game }
weather = { warm, windy }

285

285a — Initialize all counters to zero (0) and all blacklist flags to FALSE
285b — counter[0]++ // jeans clean
counter[1]++ // sweatshirt clean
counter[4]++ // sweater clean
counter[2]++ // party tonight
blacklist[1] = TRUE // warm
285c — Node 271: ((counter[0] == 2) → FALSE) AND ((NOT blacklist[0]) → TRUE) : FALSE
285d — Node 272: ((counter[1] == 1) → TRUE) AND ((NOT blacklist[1]) → FALSE) : FALSE
285e — Node 274: ((counter[2] == 1) → TRUE) AND ((NOT blacklist[2]) → TRUE) : TRUE
285f — Node 277: ((counter[4] == 1) → TRUE) AND ((NOT blacklist[4]) → TRUE) : TRUE
285g — Node 279: wear leggings and sweater

FIG. 2J

230 clean_clothes = { jeans, t-shirt, sweater }
tests_today = ( physics )
events_tonight = { party, basketball game }
weather = { cool, windy }

290

290a — Initialize all counters to zero (0) and all blacklist flags to FALSE

290b —
counter[0]++ // jeans clean
counter[0]++ // t-shirt clean
counter[4]++ // sweater clean
blacklist[2] = TRUE // physics test today
counter[2]++ // party tonight 290c — Node 271. ((counter[0] == 2) → TRUE) AND ((NOT blacklist[0]) → TRUE) : TRUE 290d — Node 273. wear jeans and t-shirt

SYSTEMS FOR FAST AND/OR EFFICIENT PROCESSING OF DECISION NETWORKS, AND RELATED METHODS AND APPARATUS

CROSS-REFERENCE TO RELATED APPLICATIONS

This application claims the benefit of U.S. Provisional Application No. 62/715,342 filed Aug. 7, 2018, which is incorporated herein by reference in its entirety.

FIELD OF THE DISCLOSURE

The present disclosure relates generally to improved techniques for representing and processing decision networks.

BACKGROUND

A decision tree is a model for possible outcomes of a set of related conditional tests or decisions. Decision trees may be used as tools that support decision making. A decision tree is generally represented as an acyclic, directed, connected tree structure, such that any two nodes in the tree are connected by one and only one path. Decision trees may include decision nodes and terminal nodes. Each decision node represents a conditional expression, and the value of the conditional expression determines which edge leading from the decision node is followed. In a sense, the value of the conditional expression may represent a decision to select the corresponding edge to which the corresponding node is connected. Each terminal node (or "leaf node") may represent an output of the decision tree, which is the result of the combination of decisions along the path from the root decision node to the terminal node. Decision trees may be binary, such that each decision node has only two possible outcomes.

Decision networks (e.g., decision trees) can be used to classify data, make decisions, and make predictions in a wide variety of fields, including operations management, fault diagnosis, and predictive analytics. In many of those fields, efficient processing of decision networks is desirable to satisfy temporal constraints (e.g., to process decision networks in real-time) and/or to limit utilization of computer resources (e.g., processor cycles, power, memory, etc.).

Conventional techniques for processing decision trees are often inefficient. In some cases, a serialized evaluation of the tree's decision nodes is performed. This approach tends to be slow because there is very little parallelism for processing devices to exploit to accelerate the evaluation process. In addition, this approach generally involves random access to the regions of memory in which the input data and/or the decision tree are stored, which can lead to long memory access latency. Alternatively, a parallelized evaluation of the tree's decision nodes may be performed. This approach can be faster than serialized evaluation because there is more parallelism for processing devices to exploit. However, parallelized evaluation of a decision tree can be wasteful because the conditions corresponding to all nodes may be evaluated, including the conditions corresponding to nodes that ultimately do not affect the decision tree's output for a given set of input data.

These inefficiencies can be particularly problematic if an application is characterized by one or more of the following conditions: (1) evaluation of a large number of decision trees, (2) evaluation of a large decision tree (e.g., a decision tree with many nodes), (3) evaluation of a decision tree in which decisions depend on sparse and/or categorical input data, and/or (4) evaluation of a decision tree in which many of the conditions represented by the decision tree's nodes are false.

BRIEF DESCRIPTION OF THE DRAWINGS

Reference will now be made to the accompanying drawings, which are not necessarily drawn to scale, and wherein:

FIG. 1 is a block diagram illustrating an exemplary, non-limiting embodiment of a communications network in accordance with various aspects described herein.

FIG. 2B is a block diagram illustrating an example, non-limiting embodiment of a data package and a serialized process for evaluating a decision network.

FIG. 2C is a block diagram illustrating an example, non-limiting embodiment of a data package and a parallel process for evaluating a decision network.

FIG. 2J depicts an illustrative embodiment of a method for determining the output of a decision network using the method of FIG. 2D and the indexes of FIG. 2I in accordance with various aspects described herein.

FIG. 2K depicts another illustrative embodiment of a method for determining the output of a decision network using the method of FIG. 2D and the indexes of FIG. 2I in accordance with various aspects described herein.

DETAILED DESCRIPTION

Figure 2A:
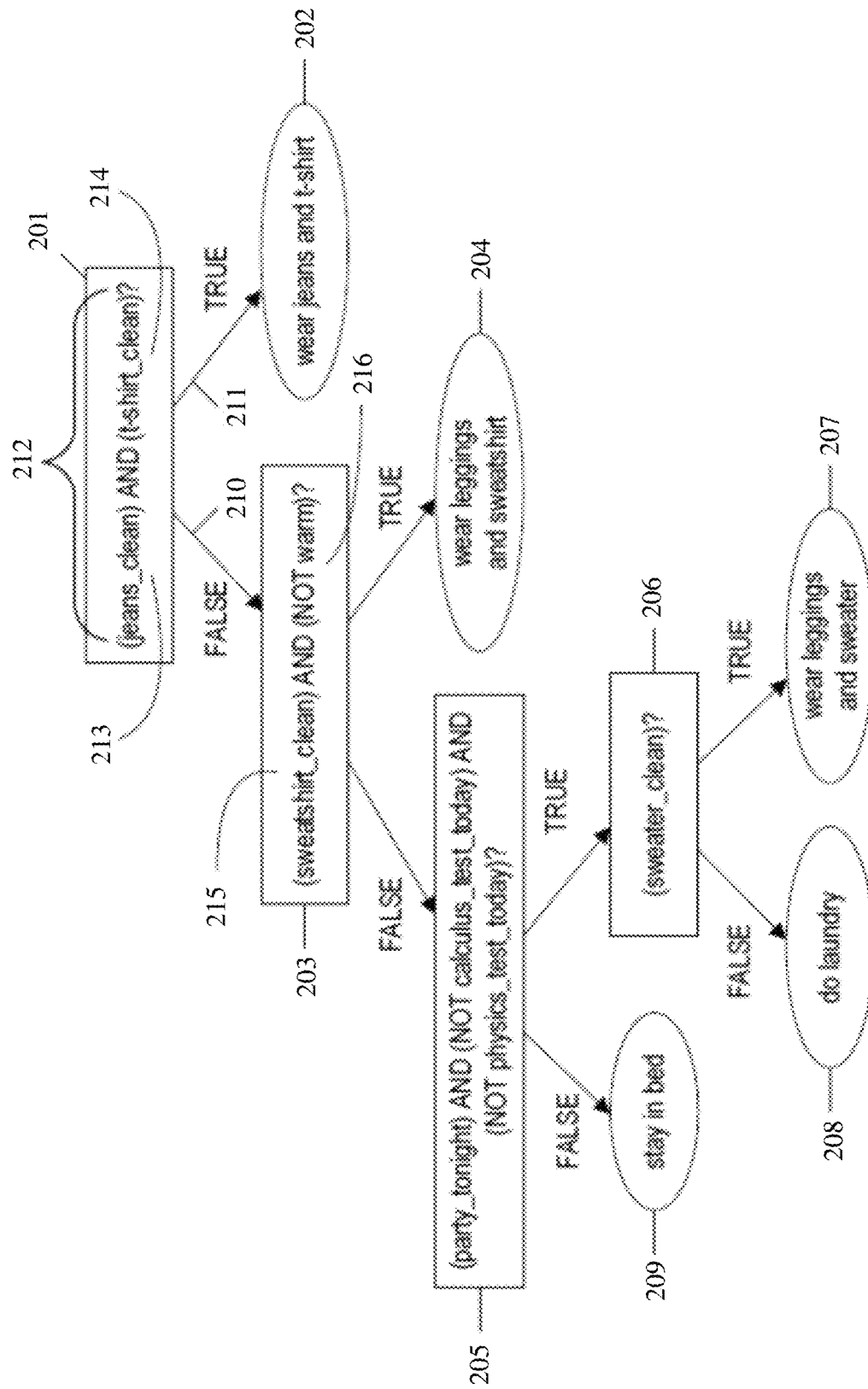
FIG. 2A is a block diagram illustrating an example, non-limiting embodiment of a decision network that models conditional rules used to determine actions by a system functioning within the communication network of FIG. 1 in accordance with various aspects described herein.

The subject disclosure describes, among other things, illustrative embodiments for efficient evaluation of decision network. Other embodiments are described in the subject disclosure.

One or more aspects of the subject disclosure include a method for obtaining, by a processing system including a processor, an index encoding a selective mapping from potential values of an input parameter to decision parameters of predicates for respective decision nodes of a decision network, wherein the decision network comprises decision nodes encoding the predicates having respective decision parameters and terminal nodes encoding respective outputs, wherein the selective mapping associates each of a plurality of potential values of the input parameter with decision parameters affected by the potential values of the input parameter; initializing, by the processing system, values of the decision parameters of the predicates for the respective decision nodes of the decision network to default values; obtaining, by the processing system, a data package specifying one or more first values of the input parameter; evaluating, by the processing system, a first group of the decision parameters that are affected by the one or more first values of the input parameter, wherein the evaluating of the first group of the decision parameters includes: identifying each decision parameter mapped to by at least one of the first values of the input parameter by the index, resulting in identified decision parameters, and setting values of the identified decision parameters in accordance with the first values of the input parameter; and subsequent to evaluating the first group of the decision parameters, analyzing, by the processing system, the decision network, wherein the analyzing includes: evaluating predicates of a first group of one or more of the decision nodes in the decision network based on the values of the respective decision parameters of the predicates, resulting in evaluated predicates, and determining, based on values of the evaluated predicates and a topology of the decision network, that a particular terminal node encodes the respective output of the decision network for the data package, wherein the first group of one or more of the decision nodes includes decision nodes forming a path from a root node of the decision network to the particular terminal node of the decision network.

One or more aspects of the subject disclosure include a machine-readable medium, comprising executable instructions that, when executed by a processing system including a processor, facilitate performance of operations, where the operations include obtaining an index encoding a selective mapping from potential values of an input parameter to decision parameters of predicates of a plurality of decision networks, wherein each of the decision networks in the plurality of decision networks includes decision nodes and terminal nodes, wherein the decision nodes encode the predicates, wherein the predicates have decision parameters, wherein the terminal nodes encode respective outputs, and wherein the selective mapping associates each of a plurality of potential values of the input parameter with decision parameters of each decision network that have respective values that are affected by the potential values of the input parameter; initializing the values of the decision parameters of each decision network to default values; receiving a data package specifying one or more first values of the input parameter; evaluating a first group of the decision parameters affected by the first values of the input parameter, wherein evaluating the first group of the decision parameters includes: identifying each decision parameter of each decision network to which the index maps at least one of the specified first values of the input parameter, resulting in identified decision parameters, and setting values of the identified decision parameters in accordance with the first values of the input parameter; and subsequent to evaluating the first group of the decision parameters, analyzing each decision network, including: evaluating the predicates of a first group of one or more of the decision nodes based on the values of the decision parameters of the respective predicates, resulting in evaluated predicates, and determining, based on values of the evaluated predicates and a topology of the decision network, that a particular terminal node encodes the respective output of the decision network for the data package.

One or more aspects of the subject disclosure include a device having a processing system including a processor; and a memory that stores executable instructions that, when executed by the processing system, facilitate performance of operations for indexing a selective mapping from potential values of an input parameter to decision parameters of predicates for respective decision nodes of a decision network, wherein the decision network comprises decision nodes encoding the predicates having respective decision parameters and terminal nodes encoding respective outputs, wherein the selective mapping associates each of a plurality of potential values of the input parameter with decision parameters affected by the potential values of the input parameter; initializing values of the decision parameters of the predicates for the respective decision nodes of the decision network to default values; receiving a data package specifying one or more first values of the input parameter; evaluating a first group of the decision parameters that are affected by the one or more first values of the input parameter, wherein the evaluating of the first group of the decision parameters includes: identifying each decision parameter from the selective mapping to at least one of the first values of the input parameter, resulting in identified decision parameters, and setting values of the identified decision parameters in accordance with the first values of the input parameter; and analyzing the decision network to discover a particular terminal node, wherein the analyzing includes: evaluating predicates of a first group of one or more of the decision nodes in the decision network based on the values of the respective decision parameters of the predicates, resulting in evaluated predicates, and determining, based on values of the evaluated predicates and a topology of the decision network, that the particular terminal node encodes the respective output of the decision network for the data package, wherein the first group of one or more of the decision nodes includes decision nodes forming a path from a root node of the decision network to the particular terminal node of the decision network.

Referring now to FIG. 1, a block diagram is shown illustrating an example, non-limiting embodiment of a communications network 100 in accordance with various aspects described herein. For example, communications network 100 can facilitate in whole or in part delivering indexes, data packages specifying one or more first values of the input parameter for a decision network, or the respective output of the decision network. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

FIG. 2A is a block diagram illustrating an example, non-limiting embodiment of a decision network that models conditional rules used to determine actions by a system functioning within the communication network of FIG. 1 in accordance with various aspects described herein. As shown in FIG. 2A, a decision network 200 models conditional rules used by a student to determine what action to take upon waking. The possible outputs of the decision network 200 depend on which articles of the student's clothing are clean, which of her subjects are being tested today, what events are taking place tonight, and the weather conditions forecasted for today. Referring to FIG. 2A, if the student's jeans and t-shirt are both clean (decision node 201), she decides to wear the jeans and t-shirt (node 202). Otherwise, if the student's sweatshirt is clean and warm weather is not forecasted (decision node 203), she decides to wear leggings and the sweatshirt (terminal node 204). Otherwise, if there is a party tonight and neither calculus nor physics is being tested today (decision node 205), she determines whether her sweater is clean (decision node 206). If the sweater is clean, she decides to wear leggings and the sweater (terminal node 207). If the sweater is not clean, she decides to do laundry (terminal node 208). If there is no party tonight or calculus is being tested today or physics is being tested today (decision node 205), she decides to stay in bed (terminal node 209).

More generally, a decision network 200 may include decision nodes (e.g., 201, 203, 205, 206) and terminal nodes (e.g., 202, 204, 207, 208, 209) connected by edges (e.g., 210, 211) to form a graph. Each decision node may represent a conditional expression (e.g., 212), and the value (e.g., TRUE or FALSE) of the conditional expression may depend on the value(s) of one or more inputs to the decision network. Each edge directed away from a decision node may correspond to a possible value of the conditional expression represented by the node. For example, in the decision network 200 of FIG. 2A, decision node 201 represents the following conditional expression: |(jeans_clean) AND (t-shirt_clean)?|. If the value of the conditional expression 212 is TRUE, then the edge 211 leading to terminal node 202 is selected. If the value of the conditional expression 212 is FALSE, then edge 210 leading to decision node 203 is selected.

A conditional expression may include one or more conditions and zero or more operators (e.g., arithmetic operators, Boolean operators, etc.). The conditions and operators may be arranged in any suitable form, including but not limited to a logical conjunction of N conditions (Condition1 AND Condition2 AND . . . AND ConditionN), a logical disjunction of M conditions (Condition1 OR Condition2 OR . . . OR ConditionM), etc. A condition of a conditional expression may include one or more "decision parameters" (e.g., input parameters of the decision network or parameters derived therefrom) and zero or more operators, such that the value of the condition may depend on the values of those decision parameters. The decision parameters and operators within a condition may be arranged in any suitable form.

In some embodiments, a condition may depend on the value of a single decision parameter. Such a condition may be referred to as a "positive condition" if the value of the condition is TRUE whenever the value of decision parameter is TRUE. Alternatively, such a condition may be referred to as a "negative condition" if the value of the condition is TRUE whenever the value of the decision parameter is FALSE. In the example of FIG. 1, the conditional expression 212 represented by decision node 201 includes two positive conditions, |jeans_clean| 213 and |t-shirt_clean| 214. Also, the conditional expression represented by decision node 203 includes one positive condition |sweatshirt_clean| 215 and one negative condition |NOT warm| 216.

FIG. 2B is a block diagram illustrating an example, non-limiting embodiment of a data package and a serialized process for evaluating a decision network 200 in accordance with various aspects described herein. Referring to FIG. 2B, the output of the decision network 200 may be determined, for example, by serially visiting the nodes along a path from a first node (e.g., root node) of the network to the terminal node representing the network's output, with the conditional expression for a given node being evaluated when that node is visited. Such serialized processing of decision networks can be slow, as the example of FIG. 2B demonstrates.

In the example of FIG. 2B, the decision network 200 has four input parameters: 'clean_clothes,' 'tests_today,' 'events_tonight,' and 'weather.' Each of the input parameters has categorical values. As shown in data package 218, the value of the 'clean_clothes' parameter is the set {jeans, sweatshirt, sweater}, indicating that the student's jeans, sweatshirt, and sweater are clean. The value of the 'tests_today' parameter is the set {history}, indicating that a test is scheduled in the student's history class today. The value of the 'events_tonight' parameter is the set {party, basketball_game}, indicating that a party and a basketball game are scheduled tonight. The value of the 'weather' parameter is the set {warm, windy}, indicating that the weather forecast calls for warm and windy weather today.

Referring again to FIG. 2B, a serialized process 220 of applying decision network 200 to data package 218 is shown. In the serialized process of FIG. 2B, each process step 221-225 corresponds to visiting a node and determining the node's value (e.g., evaluating the conditional expression associated with a decision node or determining the output associated with a terminal node), and the process steps 221-225 are performed in sequence.

In process step 221, the serialized processing of the network begins by visiting the decision network's root decision node 201. The conditional expression 212 is evaluated, returning the value FALSE because the value of the 'clean_clothes' parameter indicates that the student's t-shirt is not clean. Thus, in process step 222, decision node 203 is visited. The node's conditional expression is evaluated, returning the value FALSE because the 'weather' parameter indicates that the value of the condition |NOT warm| is FALSE. Thus, in process step 223, decision node 205 is visited. The node's conditional expression is evaluated, returning the value TRUE because all conditions of the expression are TRUE (the 'events_tonight' parameter indicates that there is a party tonight, and the 'tests_today' parameter indicates there is neither a calculus test nor a physics test today). Thus, in process step 224, decision node 206 is visited. The node's conditional expression is evaluated, returning the value TRUE because the 'clean_clothes' parameter indicates that the student's sweater is clean. Thus, in process step 225, terminal node 207 is visited, and the decision to wear leggings and a sweater is selected.

Serialized processing of decision networks, as illustrated in FIG. 2B, can be slow. For example, serialized processing of decision networks can be slow because each conditional expression in the sequence of decision nodes between the network's root node and selected terminal node is evaluated only after the values of all earlier conditional expressions in the sequence have been determined, even though the values of the later conditional expressions in the sequence do not necessarily depend on the values of the earlier conditional expressions in the sequence. In other words, the serialized processing of decision networks imposes unnecessary control flow dependences between the conditional expressions, thereby limiting the amount of parallelism (e.g., instruction-level parallelism, memory-level parallelism, data parallelism, etc.) available for processing devices to exploit.

In addition to imposing unnecessary limits on parallelism in the processing of conditional expressions, serialized processing of decision networks can result in unpredictable or haphazard patterns of access to a large region of a computer system's memory, thereby leading to long-latency memory operations. It is well-known that computer systems generally use a hierarchy of memory devices, including small, fast caches that provide fast access to a relatively small number of memory addresses, and larger, slower memories that provide slower access to a relatively large number of memory addresses. Such hierarchical memory systems can be effective at reducing the average latency of memory-access operations when the computer's processing device(s) access a small number of memory addresses repeatedly and/or access memory addresses in a predictable pattern, such that the data requested by the processing device(s) is generally available in the small, fast caches. However, hierarchical memory systems are generally ineffective at reducing the latency of memory-access operations when a large set of memory addresses are accessed in unpredictable or haphazard patterns.

When a computer processes a decision network serially, a processing device may access the network's input parameters and/or nodes in an unpredictable or haphazard (e.g., random) manner, because the order in which the network's nodes are accessed and the conditional expressions are evaluated is highly dependent on the values of the input parameters. When the input data set is large, random access to the region of memory storing the data structures encoding the input parameters can lead to long-latency memory operations, which are slow. Likewise, when the decision network is large, random access to the region of memory storing the data structures encoding the decision network's nodes and conditional expressions can also lead to long-latency memory operations.

FIG. 2C is a block diagram illustrating an example, non-limiting embodiment of a data package and a parallel process for evaluating a decision network 200. The output of the decision network 200 may be determined by evaluating all the network's conditional expressions in parallel and then visiting the nodes along a path from a first node (e.g., root node) of the network to the terminal node representing the network's output, as illustrated in FIG. 2C. Such parallel processing of decision networks can be fast but inefficient, as the example of FIG. 2C demonstrates.

In the example of FIG. 2C, the decision network 200 has four categorical input parameters: 'clean_clothes,' 'tests_today,' 'events_tonight,' and 'weather.' As shown in data package 230, the value of the 'clean_clothes' parameter is the set {jeans, t-shirt, sweater}, indicating that the student's jeans, t-shirt, and sweater are clean. The value of the 'tests_today' parameter is the set {physics}, indicating that a test is scheduled in the student's physics class today. The value of the 'events_tonight' parameter is the set {party, basketball_game}, indicating that a party and a basketball game are scheduled tonight. The value of the 'weather' parameter is the set {cool, windy}, indicating that the weather forecast calls for cool and windy weather today.

Referring again to FIG. 2C, a parallelized process 240 of applying decision network 200 to data package 230 is shown. In the parallelized process of FIG. 2C, the conditional expressions associated with all of the network's decision nodes are evaluated in parallel in process step 241, and the nodes of the evaluated network are visited in steps 242 and 243 to determine the network's output. The process steps 241-243 are performed in sequence, but the processing within each process step may be performed in parallel.

In process step 241, the conditional expressions associated with all of the network's decision nodes are evaluated in parallel. In particular, the conditional expression 212 is evaluated, returning the value TRUE because the value of the 'clean_clothes' parameter indicates that the student's jeans and t-shirt are both clean. The conditional expression associated with decision node 203 is also evaluated, returning the value FALSE because the value of the 'clean_clothes' parameter indicates that the student's sweatshirt is not clean. The conditional expression associated with decision node 205 is evaluated, returning the value FALSE because the value of the 'tests_today' parameter indicates that a test is scheduled in the student's physics class today. The conditional expression associated with decision node 206 is also evaluated, returning the value TRUE because the value of the 'clean_clothes' parameter indicates that the student's sweater is clean.

In step 242, the network's root decision node 201 is visited. The value of the conditional expression 212 is TRUE. Thus, in step 243, decision node 202 is visited, and the decision to wear jeans and a t-shirt is selected.

As illustrated in FIG. 2C, parallelized evaluation of all the conditional expressions associated with a decision network's decision nodes prior to visiting the network's nodes to determine the network's output can be fast but inefficient. In particular, when the value of each node's conditional expression does not depend on the value of any other node's conditional expression and sufficient processing resources are available, parallelized evaluation of all of the decision network's decision nodes can be performed quickly. However, such parallelized evaluation of the network's decision nodes can be wasteful because all decision nodes are evaluated, including the decision nodes that ultimately do not affect the decision tree's output. In the example of FIG. 2C, the only decision node visited during the processing of the decision network is decision node 201, yet decision nodes 203, 205 and 206 are also evaluated during process step 241.

Thus, the parallel processing technique illustrated in FIG. 2C can make inefficient use of processing resources, because this technique can waste processing resources on the evaluation of unvisited decision nodes. This inefficiency can be quite substantial under certain conditions (e.g., if the decision network 200 is large).

In contrast to the processing techniques illustrated in FIGS. 2B and 2C, some embodiments of the processing techniques described below may yield fast and efficient processing of decision networks by exploiting more parallelism than the serialized technique of FIG. 2B and performing less wasteful processing than the parallelized technique of FIG. 2C.

Figure 2D:
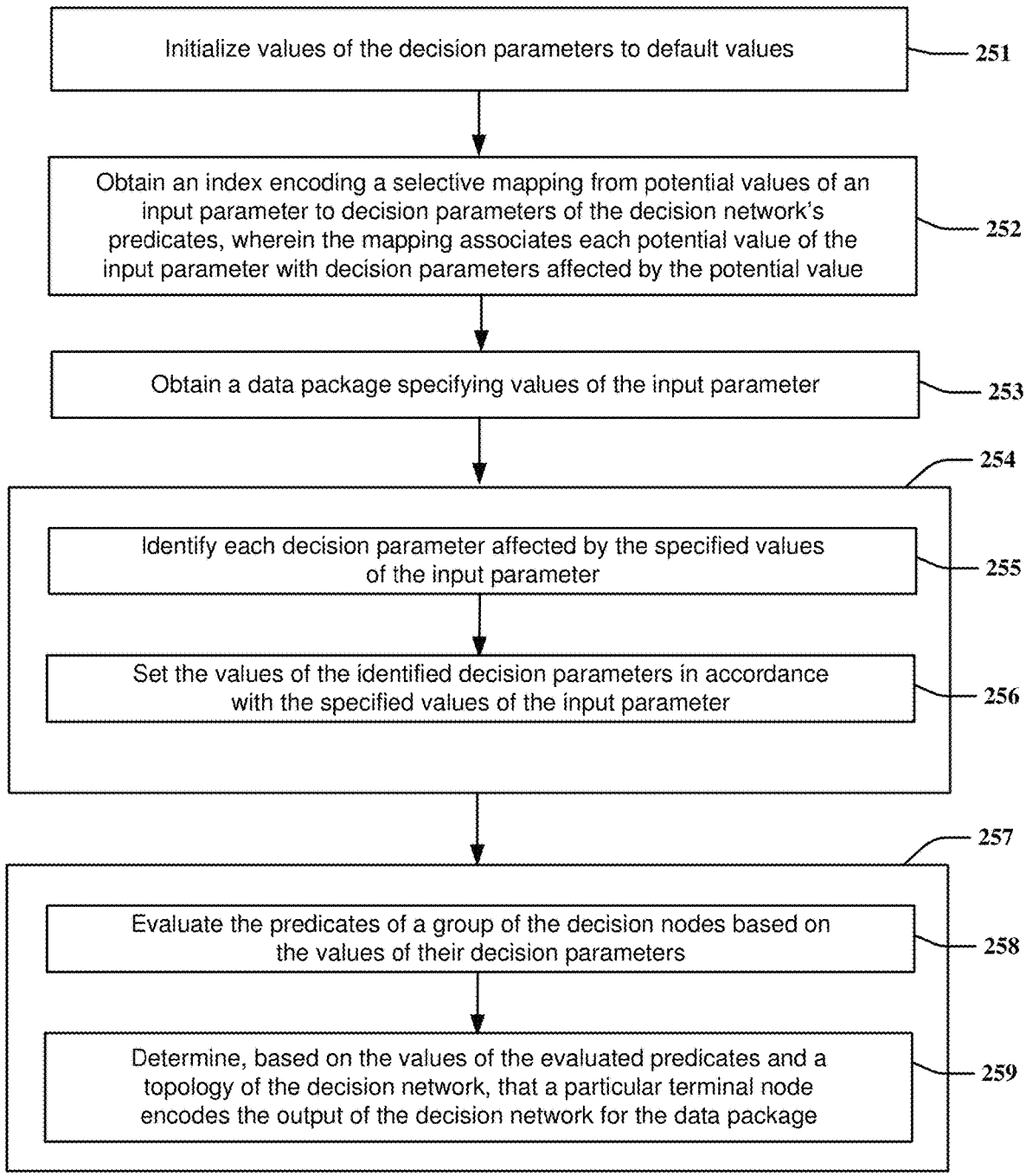
FIG. 2D depicts an illustrative embodiment of a method for determining the output of a decision network in accordance with various aspects described herein.

FIG. 2D depicts an illustrative embodiment of a method 250 for determining the output of a decision network in accordance with various aspects described herein. Referring to FIG. 2D, in step 251, the values of the decision network's decision parameters are initialized to default values. In step 252, an index (e.g., a reverse index) encoding a selective mapping from potential values of an input parameter of the decision network to decision parameters of the decision network's conditional expressions (e.g., predicates) is obtained. The index may map each potential value PV of the input parameter to each decision parameter DP that is affected by that potential value PV (e.g., each decision parameter DP that exhibits a non-default value when the input parameter exhibits the potential value PV). In step 253, a data package specifying values of the input parameter is obtained. In step 254, the decision parameters affected by the specified values of the input parameter(s) are identified, and the values of those decision parameters are determined. In step 257, the decision network is analyzed, which may include evaluating the predicates of a group of the decision nodes and determining the output of the decision network. Some embodiments of steps 251-259 of the method 250 are described below in further detail.

In step 251 of the method 250, the values of a decision network's decision parameters are initialized to default values. In some embodiments, each of the decision network's predicates may be structured as an individual condition or a logical conjunction of conditions, wherein each condition consists of either a decision parameter or a negated decision parameter. In such embodiments, the default value of each decision parameter may be FALSE. This scheme generally leads to efficient results for applications in which most predicates of the decision network are expected to be FALSE for most inputs. However, other schemes for structuring a decision network's predicates and/or initializing the values of the predicates' decision parameters are possible.

For purposes of illustration, each of the predicates of the decision network 200 of FIG. 2A is structured as an individual condition (see, e.g., decision node 206) or as a logical conjunction of two or more conditions (see, e.g., decision nodes 201, 203 and 205). Furthermore, each of the conditions of the decision network 200 consists of either a decision parameter or a negated decision parameter. For example, the predicate of decision node 203 includes two conditions joined by an AND operator. The first condition consists of a decision parameter (sweatshirt_clean), and the second condition consists of a negated decision parameter (warm). Thus, the decision parameters of the decision network 200 may be initialized to their default values by setting the value of each decision parameter (e.g., jeans_clean, t-shirt_clean, sweatshirt_clean, warm, party_tonight, calculus_test_today, physics_test_today, and sweater_clean) to FALSE.

In step 252 of the method 250, an index (e.g., a reverse index) encoding a selective mapping from potential values of an input parameter to decision parameters of the decision network's predicates is obtained. As discussed above, the index may map each potential value PV of the input parameter to any decision parameters that exhibit non-default values when the input parameter exhibits that potential value PV. For ease of reference, the decision parameters that exhibit non-default values when the input parameter exhibits a particular potential value may be referred to herein as "decision parameters affected by the potential value" or "affected decision parameters."

In some embodiments, the index maps potential values of the input parameter directly to the decision parameters affected by those potential values. In addition or in the alternative, the index may map potential values of the input parameter indirectly to the affected decision parameters via the nodes of the decision network. For example, the index entry for a particular potential value may identify each node of the decision network that has a predicate with at least one decision parameter affected by the potential value, and may also identify the affected decision parameters within each node's predicate.

In some embodiments, the index entry for a potential value may simply identify the decision parameters affected by the potential value, without specifying the non-default values to be assigned to decision parameters when the input parameter exhibits the potential value. This scheme may be sufficient, for example, if the data type of an affected decision parameter is Boolean (in which case the value of the affected decision parameter can simply be set to whatever Boolean value is not the decision parameter's default value), or if the non-default value of the affected decision parameter can be determined at run-time based on the potential value of the input parameter. Alternatively, the index entry for a potential value may not only identify the decision parameters affected by the potential value, but also specify the non-default values to be assigned to the affected decision parameters when the input parameter exhibits the potential value. In some embodiments, an index entry may even identify a set of instructions (e.g., a software function) that can be invoked to set the value of an affected decision parameter to the appropriate non-default value when the input parameter exhibits the corresponding potential value.

Any suitable techniques may be used to obtain the index(es) corresponding to the decision network's input parameter(s). In some embodiments, an index is constructed before the decision network is deployed (e.g., before the decision network is applied to actual values of input parameters in the context of a real-world application). In such embodiments, the index(es) corresponding to a decision network may be distributed with the decision network, obtained via a communication network, loaded from a local memory device, etc.

Any suitable techniques may be used to construct the index(es) corresponding to the decision network's input parameter(s). Attributes of an input parameter's index (e.g., the structure of the index) may be determined based, at least in part, on the input parameter's data type. For categorical data types (e.g., enumerated types, integer types, etc.), any index data structure (e.g., an inverted index) suitable for mapping potential values of an input parameter to affected decision parameters may be used. In some embodiments, an index for a categorical input parameter has index entries only for potential values of the input parameter that actually affect at least one decision parameter in the decision network. Alternatively, an index may have entries for all potential values of an input parameter, and the entries for potential values that do not affect any decision parameters in the decision network may so indicate.

For numeric data types (e.g., integer types, real number types, etc.), some embodiments may use any index structure (e.g., an interval index) suitable for mapping intervals (e.g., numeric ranges) to decision parameters affected by potential values of the input parameter within the interval. In some embodiments, an interval index has index entries only for intervals of the input parameter's value that actually affect at least one decision parameter in the decision network. Alternatively, an interval index's entries may collectively span the entire range of potential values of an input parameter, and the entries for intervals that do not affect any decision parameters in the decision network may so indicate. The intervals mapped by an interval index may be non-overlapping. Alternatively, one or more mapped intervals may overlap with one or more other mapped intervals in full or in part.

In some cases, all the values within a given interval mapped to a decision parameter affect the decision parameter in the same way. For example, whenever the input parameter has any value V1 within a particular interval INT, the affected decision parameter may be assigned a corresponding non-default value V2. Values within the same interval may affect different decision parameters differently. For example, when the input parameter has any value V1 within a particular interval INT, one affected decision parameter may be assigned a corresponding non-default value V2, and another affected decision parameter may be assigned a different non-default value V3.

In some cases, different values within a given interval mapped to a decision parameter can affect that decision parameter in different ways. For example, when the input parameter has a value V1 within an interval INT, the affected decision parameter may be assigned a corresponding non-default value V2, but when the input parameter has a value V3 within the same interval INT, the affected decision parameter may be assigned a different non-default value V4. In such embodiments, the index entry for an interval may include (or identify) a mechanism for determining the non-default values of affected decision parameters based on the value of the input parameter. Some non-limiting examples of such a mechanism include a lookup table, a mathematical function, a computational function, etc.

In some embodiments, automated dataflow analysis techniques are used to determine how the potential values of an input parameter can affect the values of the network's decision parameters, and the results of the dataflow analysis are used to automatically construct the input parameter's index. In some embodiments, the index corresponding to an input parameter is specified by a user (e.g., by the same user who specifies the topology, predicates, and outputs of the decision network, or by another user who manually analyzes the dataflow relationships in the decision network).

In step 253 a data package specifying values of an input parameter is obtained, so that the decision network can process the specified values. The data package may be obtained via a communication network, loaded from a local memory device, provided by a user, or obtained using any other suitable technique.

In step 254, the decision parameters affected by the specified values of the input parameter(s) are identified (sub-step 255). As discussed above, the index entry for a value of the input parameter may identify (1) each node that has a predicate that has a decision parameter affected by the input parameter value, and/or (2) each decision parameter affected by the input parameter value. Thus, the decision parameters affected by the specified values of the input parameter may be identified using an index, as set forth below in connection with FIG. 2E (e.g., by looking up the specified values of the input parameter in its index and retrieving the corresponding index entries).

In step 254, the non-default values of the affected decision parameters are set in accordance with the specified values of the input parameter (sub-step 256). As discussed above, the non-default value of an affected decision parameter may be set based on the decision parameter's data type and default value (e.g., the non-default value of an affected decision parameter of the Boolean data type may be the opposite of the decision parameter's default value). In addition or in the alternative, the index entry for a specified value of the input parameter value may identify (1) the non-default value to be assigned to an affected decision parameter when the input parameter exhibits the specified value, and/or (2) a function that can be invoked to set the value of an affected decision parameter to the appropriate non-default value. The values of the affected decision parameters may be set in accordance with the specified values of the input parameter by (1) dynamically determining a non-default value of the affected decision parameter based on the affected parameter's data type and/or default value, (2) setting the value of the affected decision parameter to a non-default value specified in the index entry for the specified value of the input parameter, and/or (3) executing instructions (e.g., a function) specified in the index entry for the specified value of the input parameter.

In step 257, the decision network is analyzed. Analyzing the decision network may include sub-steps of predicate evaluation (258) and decision determination (259). Performing the predicate evaluation step may include evaluating the predicates of a group of the decision nodes based on the values of their decision parameters. Performing the decision determination step may include identifying, based on the values of the evaluated predicates and the topology of the decision network, the terminal node that represents the output of the decision network for the obtained data package.

In some embodiments, the predicate evaluation sub-step 258 may be decoupled from the decision determination sub-step 259 (e.g., the predicate evaluation sub-step may not depend on data generated by the decision determination sub-step). In such embodiments, the selection of nodes for evaluation may be performed irrespective of and without reference to the path through the decision network that corresponds to the provided input parameter values (e.g., the path from a first node (e.g., root node) of the network to the terminal node representing the network's output for the specified input values). For example, the predicates of all the decision nodes may be evaluated during the predicate evaluation sub-step 258, and the terminal node that represents the output of the decision network may be identified based on one or more of the evaluated predicates (and the topology of the decision network) during the decision determination sub-step 259.

In some embodiments, the predicate evaluation sub-step 258 may be coupled with the decision determination sub-step 259 (e.g., the predicate evaluation sub-step may depend on data generated by the decision determination sub-step). In such embodiments, the selection of nodes for evaluation may depend on the path through the decision network that corresponds to the provided input parameter values. For example, the predicate evaluation and decision determination sub-steps may be performed in parallel, such that the predicate of a decision node is evaluated when the decision node is identified as being part of the path through the decision network that corresponds to the provided input parameter values.

Irrespective of whether the predicate evaluation sub-step 258 is decoupled from or coupled with the decision determination sub-step, any suitable technique may be used to identify the terminal node that represents the output of the decision network. For example, the output terminal node may be identified by performing an iterative process of (1) visiting a first (e.g., root) node of the decision network, (2) determining, based on the value of the visited node's predicate, which child node of the visited node is selected, (3) visiting the selected child node, and (4) repeating steps (2)-(3) if the selected child node is a decision node, else terminating the analysis of the decision network. The first terminal node visited during the decision determination sub-step is the terminal node that represents the output of the decision network for the specified input values.

In embodiments in which the predicate evaluation sub-step is decoupled from the decision determination sub-step, predicates of the decision network may be evaluated in parallel, which may result in the decision network being analyzed very quickly. However, parallel evaluation of the predicates may be somewhat wasteful, because analysis of a decision network does not require evaluation of predicates of any decision nodes that are not on the path corresponding to the specified input values.

Figure 2E:
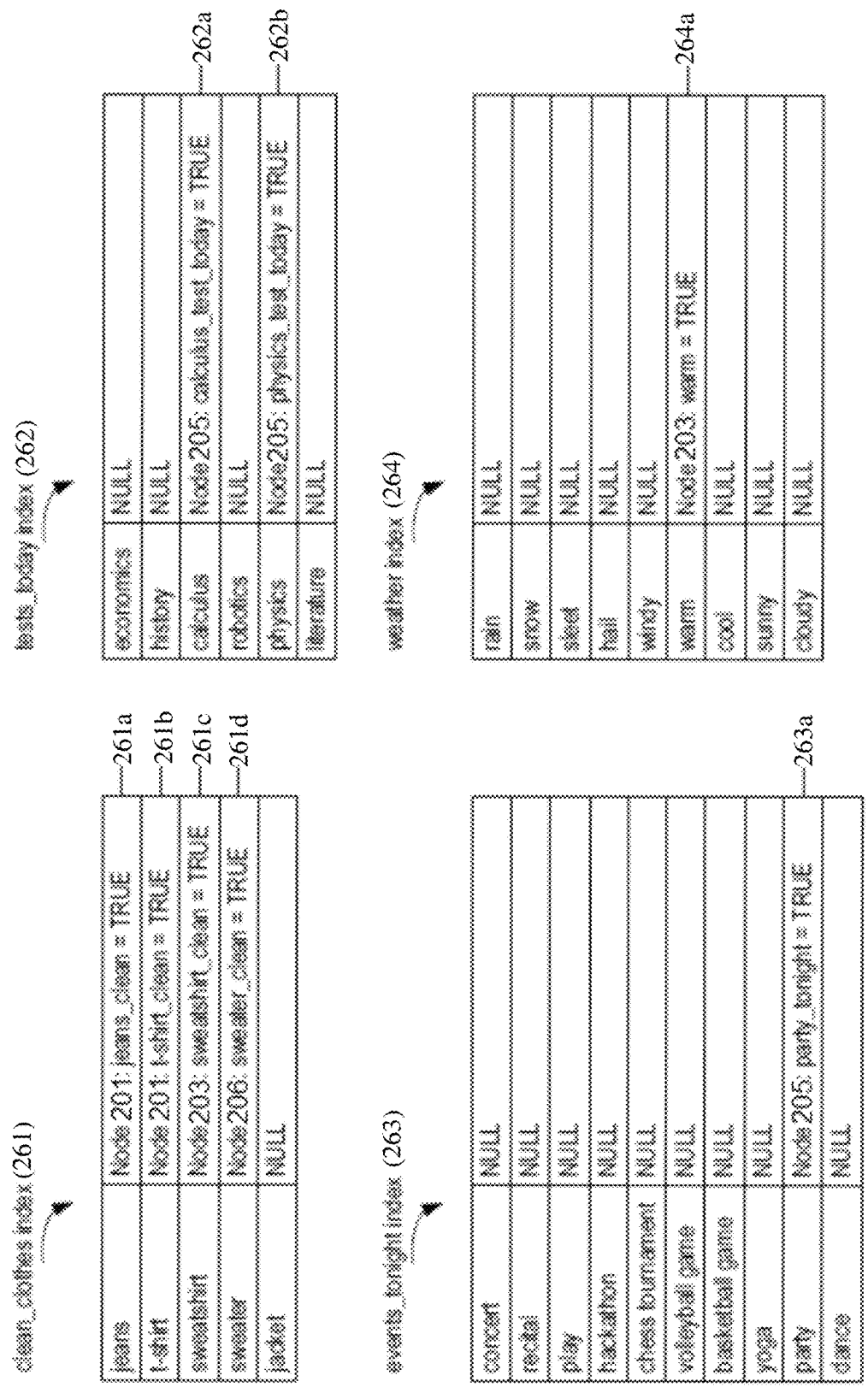
FIG. 2E is a block diagram illustrating exemplary, non-limiting embodiment of indexes for input parameters of a decision network in accordance with various aspects described herein.

FIG. 2E is a block diagram illustrating exemplary, non-limiting embodiment of indexes for input parameters of a decision network 200 in accordance with various aspects described herein. In the example of FIG. 2E, it is assumed that the value of each decision parameter of the decision network 200 is initialized to FALSE, and each index maps a potential value PV of an input parameter to a corresponding decision parameter DP only if the potential value PV indicates that the affected value of the decision parameter DP is the non-default value TRUE. Assuming that the decision parameters are initialized to default values, an index for an input parameter may be generated by mapping each potential value of the input parameter to any decision parameter(s) affected by the potential value.

For example, the clean_clothes index 261 maps each potential value of the input parameter clean_clothes to any corresponding decision parameters that are TRUE when the clean_clothes parameter exhibits that potential value. In particular, the index 261 maps the potential value "jeans" of the input parameter 'clean_clothes' to the decision parameter 'jeans_clean' in the predicate of decision node 201, indicating that the value of 'jeans_clean' should be set to TRUE when the value of the input parameter 'clean_clothes' includes the categorical value "jeans." In contrast, the index 261 does not map the potential value "jacket" of the input parameter 'clean_clothes' to any decision parameter of the decision network 200, because no decision parameter takes on a non-default value when the input parameter 'clean_clothes' includes the categorical value "jacket."

Likewise, the 'tests_today' index 262 maps each potential value of the input parameter 'tests_today' to any corresponding decision parameters that are TRUE when the 'tests_today' parameter exhibits that potential value, the events_tonight index 263 maps each potential value of the input parameter 'events_tonight' to any corresponding decision parameters that are TRUE when the 'events_tonight' parameter exhibits that potential value, and the weather index 264 maps each potential value of the input parameter 'weather' to any corresponding decision parameters that are TRUE when the 'weather' parameter exhibits that potential value.

Figures 2F, 2G:
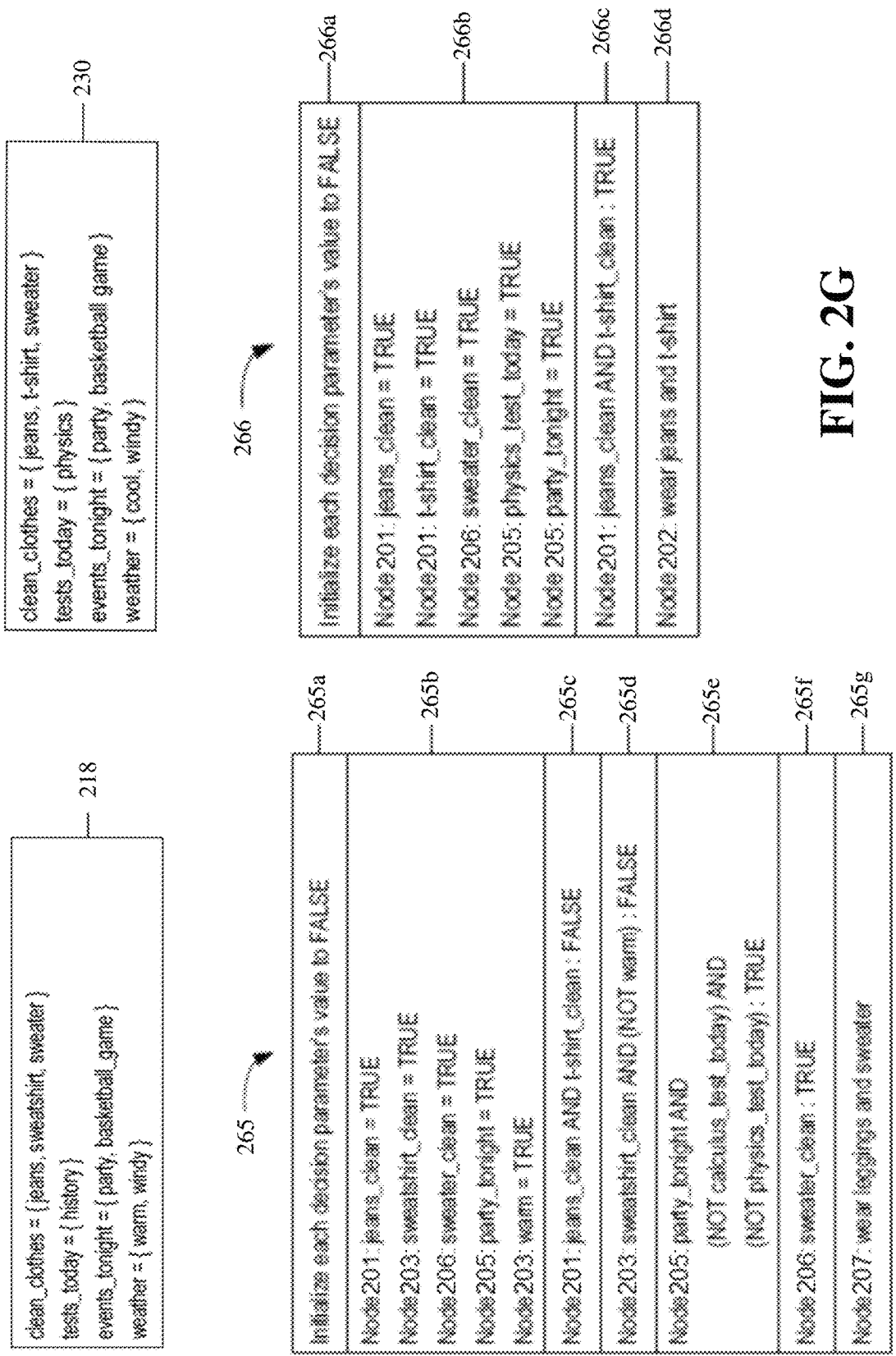
FIG. 2F depicts an illustrative embodiment of a method for determining the output of a decision network using the method of FIG. 2D and the indexes of FIG. 2E in accordance with various aspects described herein.
FIG. 2G depicts an illustrative embodiment of a method 266 for determining the output of a decision network using the method of FIG. 2D and the indexes of FIG. 2E in accordance with various aspects described herein.

FIG. 2F depicts an illustrative embodiment of a method 265 for determining the output of a decision network 200 using the method 250 of FIG. 2D and the indexes 261-264 of FIG. 2E in accordance with various aspects described herein. In the example of FIG. 2F, the data package 218 specifying the values of the input parameters is the same as the data package 218 used in the example of FIG. 2A.

In process step 265a (which corresponds to method step 251), the values of the decision parameters are initialized to their default values. For decision network 200, the decision parameters are 'jeans_clean,' 't-shirt_clean,' 'sweatshirt_clean,' 'warm,' 'party_tonight,' 'calculus_test_today,' 'physics_test_today,' and 'sweater_clean.' In the example of FIG. 2F, the default value of each decision parameter is FALSE.

The process steps corresponding to method steps 252 and 253 are not illustrated. As discussed, the example of FIG. 2F uses the indexes 261-264 shown in FIG. 2E and the data package 218 shown in FIGS. 2B and 2F.

In process step 265b (which corresponds to method step 254), the decision parameters affected by the specified values of the input parameters are identified using the indexes 261-264, and non-default values are assigned to those decision parameters. In the example of FIG. 2F, the indexes 261-264 contain five entries corresponding to the specified values of the input parameters: entries 261a, 261c, and 261d (corresponding to the "jeans," "sweatshirt," and "sweater" values of the 'clean_clothes' parameter), entry 263a (corresponding to the "party" value of the 'events_tonight' parameter), and entry 264a (corresponding to the "warm" value of the 'weather' parameter). Collectively, these index entries indicate that the following decision parameters are affected by the input values in the data package: 'jeans_clean' (node 201), 'sweatshirt_clean' (node 203), 'sweater_clean' (node 206), 'party_tonight' (node 205), and warm (node 203). Accordingly, the values of those five decision parameters are set to the appropriate non-default value (TRUE) in process step 265b. The entries of the indexes corresponding to the other values of the input parameters ('tests_today': "history," 'events_tonight': "basketball_game," and 'weather': "windy") are NULL, indicating that no decision parameters are set to non-default values in response to those three input parameter values.

In process steps 265c-265g (which correspond to method step 257), the decision network 200 is analyzed. In the example of FIG. 2F, the predicate evaluation sub-step and the decision determination sub-step are coupled. In the first step 265c of the analysis, the root node 201 of the decision network 200 is visited, the predicate of the root node 201 is determined to be FALSE (because the value of the condition |t-shirt_clean| is FALSE), and decision node 203 is identified as the selected child node. In the second step 265d of the analysis, decision node 203 is visited, the predicate of decision node 203 is determined to be FALSE (because the value of the condition |NOT warm| is FALSE), and decision node 205 is identified as the selected child node. In the third step 265e of the analysis, decision node 205 is visited, the predicate of decision node 205 is determined to be TRUE (because the values of the conditions |party_tonight |, |NOT calculus_test_today|, and |NOT physics_test_today| are TRUE), and decision node 206 is identified as the selected child node. In the fourth step 265f of the analysis, decision node 206 is visited, the predicate of decision node 206 is determined to be TRUE (because the values of the condition |sweater_clean| is TRUE), and terminal node 207 is identified as the selected child node. In the fifth step 265g of the analysis, terminal node 207 is visited and is identified as the output node for the decision tree. Thus, the decision to wear leggings and a sweater is selected.

FIG. 2G depicts an illustrative embodiment of a method 266 for determining the output of a decision network 200 using the method 250 of FIG. 2D and the indexes 261-264 of FIG. 2E in accordance with various aspects described herein. In the example of FIG. 2G, the data package 230 specifying the values of the input parameters is the same as the data package 230 used in the example of FIG. 2C.

In process step 266a (which corresponds to method step 251), the values of the decision parameters ('jeans_clean,' 't-shirt_clean,' 'sweatshirt_clean,' 'warm,' 'party_tonight,' 'calculus_test_today,' 'physics_test_today,' and 'sweater_clean') of decision network 200 are initialized to their default values (FALSE). The process steps corresponding to method steps 252 and 253 are not illustrated. As discussed, the example of FIG. 2G uses the indexes 261-264 shown in FIG. 2E and the data package 230 shown in FIGS. 2C and 2G.

In process step 266b (which corresponds to method step 254), the decision parameters affected by the specified values of the input parameters are identified using the indexes 261-264, and non-default values are assigned to those decision parameters. In the example of FIG. 2G, the indexes 261-264 contain five entries corresponding to the specified values of the input parameters: entries 261a, 261b, and 261d (corresponding to the "jeans," "t-shirt," and "sweater values" of the 'clean_clothes' parameter), entry 262b (corresponding to the "physics" value of the 'tests_today' parameter), and entry 263a (corresponding to the "party" value of the 'events_tonight' parameter). Collectively, these index entries indicate that the following parameters are affected by the input values in the data package: 'jeans_clean' (node 201), 't-shirt_clean' (node 201), 'sweater_clean' (node 206), 'physics_test_today' (node 205), and 'party_tonight' (node 205). Accordingly, the values of those five decision parameters are set to TRUE in process step 266b. The entries of the indexes corresponding to the other values of the input parameters ('events_tonight': "basketball_game," 'weather': "cool," and 'weather': "windy") are NULL, indicating that no decision parameters are set to non-default values in response to those three input parameter values.

In process steps 266c-266d (which correspond to method step 257), the decision network 200 is analyzed. In the example of FIG. 2G, the predicate evaluation sub-step and the decision determination sub-step are coupled. In the first step 266c of the analysis, the root node 201 of the decision network 200 is visited, the predicate of the root node 201 is determined to be TRUE (because the values of the conditions |jeans_clean| and |t shirt_clean| are TRUE), and node 202 identified as the selected child node. In the second step 266d of the analysis, node 202 is visited and is identified as the output node for the decision tree. Thus, the decision to wear jeans and a t-shirt is selected.

As these examples set forth in FIGS. 2F and 2G demonstrate, processing the decision network 200 using the method 250 may yield faster and/or more efficient results than processing the decision network 200 using the serialized technique of FIG. 2B or the parallelized technique of FIG. 2C. In the techniques of FIGS. 2B and 2C, the process of determining the values of the decision parameters is inextricably coupled with the process of evaluating the values of the predicates. Coupling the determination of the decision parameter values with the evaluation of the predicate values in this manner can lead to random access to the region of memory storing the input parameter values, because the order of accesses to the input parameter values depends on the order in which the predicates are evaluated when this coupling is maintained. In contrast, using the method 250, the process of determining the values of the decision parameters is decoupled from the process of evaluating the values of the predicates and driven by the input parameter values themselves rather than the order in which the predicates are evaluated. Accordingly, the region of memory storing the input parameter values can be accessed sequentially rather than randomly, leading to fewer long-latency memory operations.

In addition, the method 250 may eliminate much of the wasteful processing associated with the parallelized technique of FIG. 2C. With the parallelized technique of FIG. 2C, the value of each decision parameter in the decision network 200 may be determined. In contrast, using the method 250, non-default values may be determined only for decision parameters that are affected by the input parameter values.

For a decision network with multiple input parameters, some steps of the method 250 for determining the output of the decision network may be performed multiple times (e.g., once for each input parameter). For example, steps 251, 253, and 254 may be performed for each input parameter. In such cases, the steps associated with different input parameters may be performed sequentially or in parallel.

In some cases, two or more decision networks $N_i$ may be analyzed determine the output of each decision network for the same set of input parameter values. In such cases, the index for an input parameter (e.g., index 261 for the 'clean_clothes' parameter) may map each potential value of the input parameter to (1) each node (among the nodes of all the decision networks $N_i$) that has a predicate that has a decision parameter affected by the input parameter value, and/or (2) each decision parameter (among the decision parameters of all the decision networks $N_i$) affected by the input parameter value. Using a single index for a set of related decision networks in this manner can improve the efficiency with which the decision networks $N_i$ are analyzed, because the computational cost of looking up a parameter value in the index is effectively amortized over multiple decision networks.

An example has been described in which each of a decision network's predicates is structured as an individual condition or a logical conjunction of conditions, with each condition consisting of a decision parameter or a negated decision parameter, and with each decision parameter initialized to the value FALSE. However, other schemes for structuring a decision network's predicates and/or initializing the values of the predicates' decision parameters are possible. For example, each of the decision network's predicates may be structured as an individual condition or a logical disjunction of conditions, wherein each condition consists of either a decision parameter or a negated decision parameter. In such embodiments, the default value of each decision parameter may be TRUE, and the index may map a potential value PV of the input parameter to a decision parameter DP if the decision parameter DP is affected by the potential value PV. This scheme may generally lead to efficient results for applications in which most predicates of the decision network are expected to be TRUE for most inputs.

Even when the above-described techniques are used, evaluating the predicates of a decision network can involve a substantial amount of computation, particularly for predicates that include a relatively large number of conditions. Furthermore, evaluating the predicates of a decision network may involve random or unpredictable accesses to the network's decision parameters, which can lead to long memory access latency. Some embodiments of additional techniques for further enhancing the speed and/or efficiency of the evaluation of decision networks are described below.

In some embodiments, the computational speed and/or efficiency of the method 250 for processing a decision network can be further enhanced by using a counter-and-blacklist data structure to represent the predicates of the decision network's decision nodes. A counter-and-blacklist data structure, which includes a counter variable (the counter) and a Boolean flag (the blacklist flag), may be used to represent a predicate if the predicate consists of a single condition or a logical conjunction of two or more conditions. In particular, all the positive conditions of the predicate may be represented by the counter, such that the value of the predicate's counter indicates whether all of the positive conditions are TRUE, i.e., a total number of positive conditions minus one. In addition, all of the negative conditions of the predicate may be represented by the predicate's blacklist flag, such that the value of a predicate's blacklist flag indicates whether all of the predicate's negative conditions are FALSE.

Using the counter-and-blacklist data structure to represent a predicate effectively collapses the decision parameters of the predicate's positive conditions into a single decision parameter (the counter) and collapses the decision parameters of the predicate's negative conditions into a single decision parameter (the blacklist flag). In this way, the counter-and-blacklist data structure can reduce the amount of memory used to store the predicates, which can improve the locality and reduce the average latency of memory accesses. Also, using the counter-and-blacklist data structure to represent a predicate effectively collapses the predicate's positive conditions into a single positive condition (e.g., a comparison of the counter's value or sign to a reference value or sign) and collapses the predicate's negative conditions into a single negative condition (whether the blacklist flag's value is TRUE or FALSE). In this way, the counter-and-blacklist data structure can also reduce the amount of computation used to evaluate the predicates, which can improve the efficiency and increase the speed of the process of evaluating the decision network.

The counter-and-blacklist data structure can be integrated into the decision network processing method 250 as follows. At step 251, the value of each predicate's counter may be set to a default value indicating that none of the positive conditions are known to be TRUE (e.g., the default value of the counter may be a total number of positive conditions minus one). The value of each predicate's blacklist flag can be set to a default value indicating that none of the predicate's negative conditions are known to be FALSE (e.g., the default value of the blacklist flag may be FALSE).

At step 252, in the index from potential values of an input parameter to the decision network's decision parameters, the index entry for a potential value PV of an input parameter that affects the decision parameter of a positive condition of a predicate may identify the predicate's counter and indicate that the counter is decremented if the input parameter exhibits the potential value PV. Likewise, the index entry for a potential value PV of an input parameter that affects the decision parameter of a negative condition of a predicate may identify the predicate's blacklist flag and indicates that the flag's value is set to TRUE if the input parameter exhibits the potential value PV.

At step 254 (setting non-default values of decision parameters affected by the specified values of the input parameter), the counters affected by the specified values of the input parameter may be identified and decremented. In particular, a predicate's counter may be decremented once for each specified value of the input parameter that affects the decision parameter of a positive condition of the predicate. Likewise, the blacklist flags affected by the specified values of the input parameter may be identified and their values may be set to TRUE. In particular, a predicate's blacklist flag may be set to TRUE if any specified value of any input parameter affects the decision parameter of a negative condition of the predicate.

At step 258, the evaluation of a predicate may be carried about by determining whether (1) the value of the predicate's counter is negative (indicating that all the positive conditions of the original predicate are TRUE), and (2) the value of the predicate's blacklist flag is FALSE (indicating that all the negative conditions of the original predicate are TRUE). The former test is the collapsed predicate's positive condition, and the latter test is the collapsed predicate's negative condition. If the collapsed predicate's positive and negative conditions are both TRUE, the predicate evaluates to TRUE. Otherwise, the predicate evaluates to FALSE.

The foregoing paragraphs describe an embodiment in which a predicate's counter is incremented when the decision parameter of a positive condition of the parameter is affected by a value of the input parameter. However, implementation of predicates based on the counter-and-blacklist data structure are not limited to incrementing counters. In some embodiments, a predicate's counter is decremented when the decision parameter of a positive condition of the parameter is affected by a value of the input parameter.

The decision network processing method 250 can be modified to accommodate an incrementing counter as follows. At step 251, the value of each predicate's counter may be set to a default value indicating that none of the positive conditions are known to be TRUE (e.g., the default value of the counter may be 0). At step 252, in the index from potential values of an input parameter to the decision network's decision parameters, the index entry for a potential value PV of an input parameter that affects the decision parameter of a positive condition of a predicate may identify the predicate's counter and indicate that the counter is incremented if the input parameter exhibits the potential value PV. At step 254 (setting non-default values of decision parameters affected by the specified values of the input parameter), the counters affected by the specified values of the input parameter may be identified and incremented. In particular, a predicate's counter may be incremented once for each specified value of the input parameter that affects the decision parameter of a positive condition of the predicate. At step 258, the evaluation of a predicate may be carried about by determining whether (1) the value of the predicate's counter is equal to the number of positive conditions in the original predicate (indicating that all the positive conditions of the original predicate are TRUE), and (2) the value of the predicate's blacklist flag is FALSE (indicating that all the negative conditions of the original predicate are TRUE). The former test is the collapsed predicate's positive condition, and the latter condition is the collapsed predicate's negative condition. If the collapsed predicate's positive and negative conditions are both TRUE, the predicate evaluates to TRUE. Otherwise, the predicate evaluates to FALSE.

In some embodiments, the counters and blacklist flags of a decision network's predicates may be stored in lists (e.g., parallel arrays) to further improve locality of memory access.

Figure 2H:
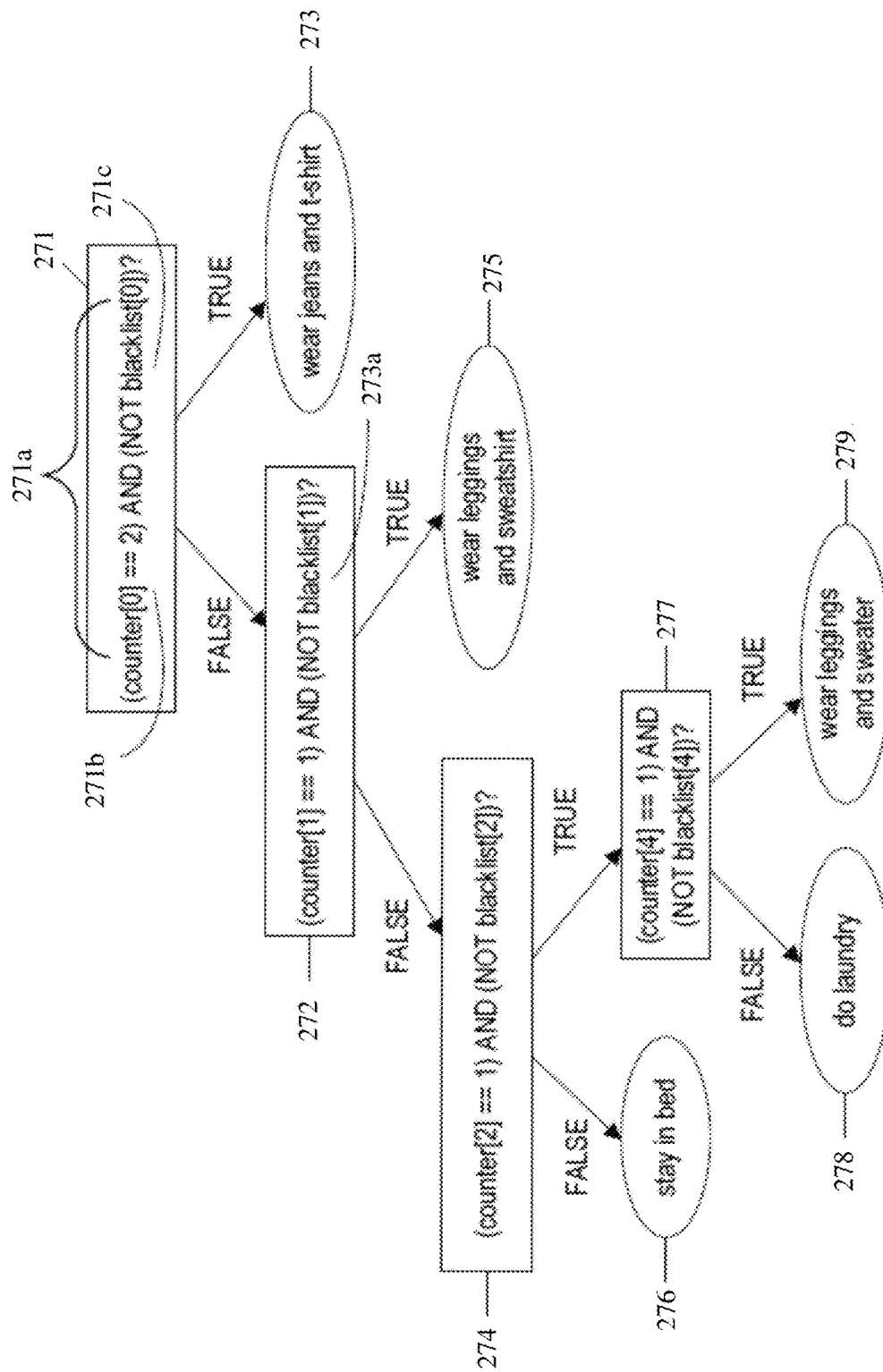
FIG. 2H is a block diagram illustrating an example, non-limiting embodiment of a decision network that models conditional rules to determine an action to take in accordance with various aspects described herein.
Figure 2I:
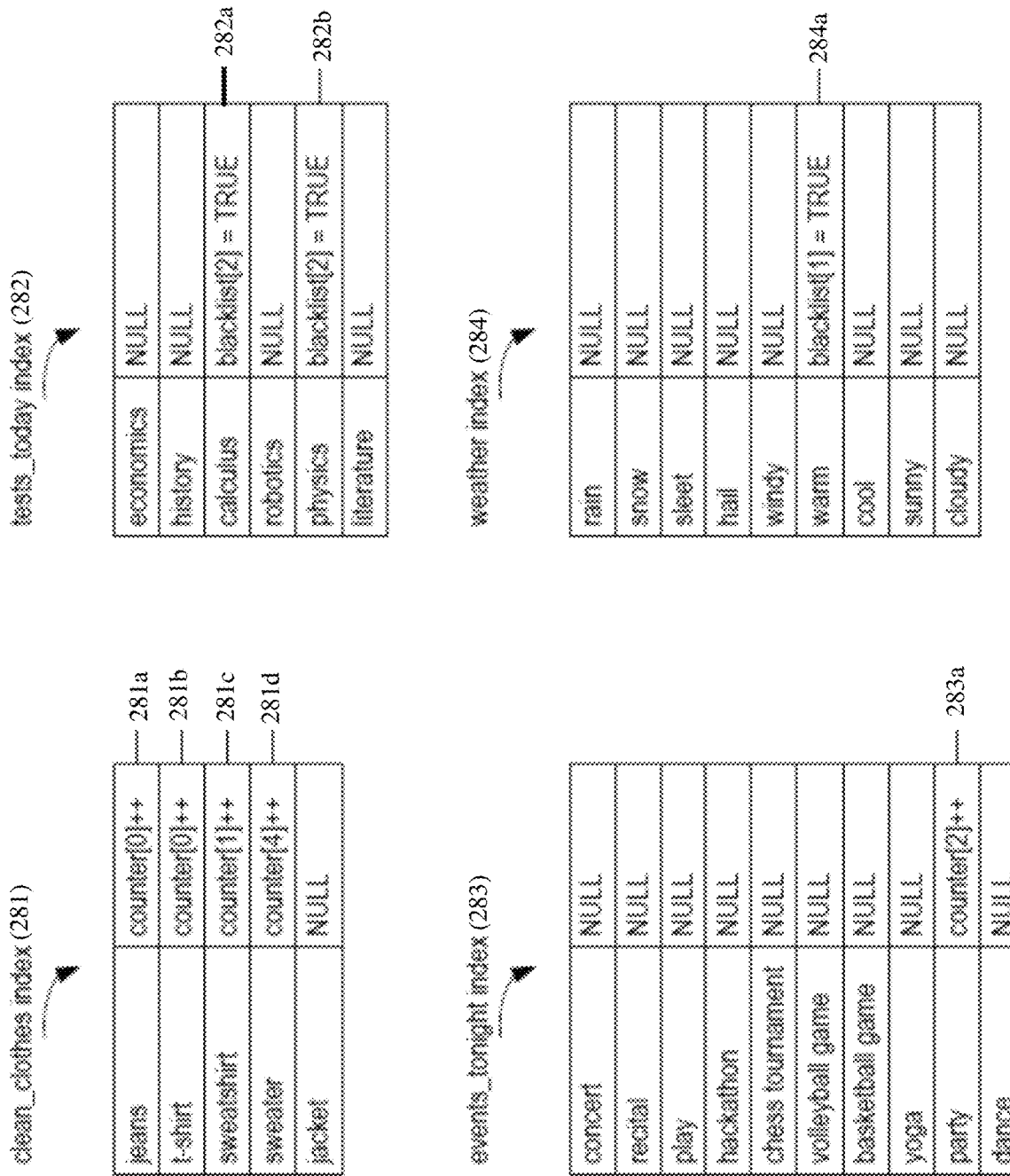
FIG. 2I is a block diagram illustrating exemplary, non-limiting embodiment of indexes for input parameters of a decision network in accordance with various aspects described herein.

FIG. 2H is a block diagram illustrating an example, non-limiting embodiment of a decision network 270 that models conditional rules used by a student to determine what action to take upon waking in accordance with various aspects described herein. FIG. 2I is a block diagram illustrating exemplary, non-limiting embodiment of indexes 281-284 for input parameters of a decision network 270 in accordance with various aspects described herein. Referring to FIGS. 2H and 2I, the decision network 270 models the same rules as the decision network 200 of FIG. 2A, but in the example of FIG. 2H, the original decision parameters and conditions of the predicates are collapsed into a single positive condition testing the value of an incrementing counter and a single negative condition testing the value of a blacklist flag. Likewise, the indexes 281-284 of FIG. 2I perform the same mapping function as the indexes 261-264 of FIG. 2E, but in the example of FIG. 2I, the potential values of the input parameters are mapped to the affected counters and blacklist flags, rather than the original decision parameters.

For example, the original predicate of root node 201 of decision network 200 has two positive conditions (|jeans_clean| and |t-shirt_clean|) and no negative conditions. In the corresponding root node 271 of decision network 270, the collapsed predicate 271a has one positive condition (|counter[0]==2|) and one negative condition (|NOT blacklist[0]|). Likewise, entries 261a and 261b of the original clean_clothes index 261 for decision network 200 indicate that decision parameters 'jeans_clean' and 't-shirt_clean' of node 201 are affected by the values "jeans" and "t-shirt" of the 'clean_clothes' input parameter. In the corresponding clean_clothes_index 281 for decision network 270, entries 281a and 281b indicate that counter[0] is affected by the values "jeans" and "t-shirt" of the 'clean_clothes' input parameter. Specifically, the value of counter[0] is incremented when the 'clean_clothes' input parameter exhibits those values.

As another example, the original predicate of decision node 203 of decision network 200 has one positive condition |sweatshirt_clean| and one negative condition |NOT warm|. In the corresponding node 272 of decision network 270, the collapsed predicate has one positive condition |counter[1]==1| and one negative condition |NOT blacklist[1]| Likewise, entries 261c and 264a of the original indexes 261 and 264 for decision network 200 indicate that (1) decision parameter 'sweatshirt_clean' of decision node 203 is affected by the value "sweatshirt" of the 'clean_clothes' input parameter, and (2) decision parameter 'warm' of decision node 203 is affected by the value "warm" of the 'weather' input parameter. In the corresponding indexes 281-284 for decision network 270, entries 281c and 284a indicate that (1) the counter of the predicate of node 273 (i.e., counter[1]) is affected by the value "sweatshirt" of the 'clean_clothes' input parameter, and (2) the blacklist flag of the predicate of node 273 (i.e., blacklist[1]) is affected by the value "warm" of the 'weather' input parameter. Specifically, the value of counter[1] is incremented when the 'clean_clothes' input parameter exhibits the value "sweatshirt," and the value of blacklist[1] is set to TRUE when the 'weather' input parameter exhibits the value "warm."

For brevity, the remaining examples of the correspondence between (1) the decision network 200 and the indexes 261-264, and (2) the decision network 270 and the indexes 281-284 are not belabored here. One of ordinary skill in the art will appreciate the relationships between the two decision networks and the two sets of indexes.

FIG. 2J depicts an illustrative embodiment of a method 285 for determining the output of a decision network 270 using the method 250 of FIG. 2D and the indexes 281-284 of FIG. 2I in accordance with various aspects described herein. In the example of FIG. 2J, the data package 218 specifying the values of the input parameters is the same as the data package 218 used in the examples of FIGS. 2B and 2F.

In process step 285a (which corresponds to method step 251), the values of the decision parameters are initialized to their default values. For decision network 270, the decision parameters are the counters and blacklist flags. In the example of FIG. 2J, the default value of each counter is zero, the counters are incrementing counters, and the default value of each blacklist flag is FALSE.

The process steps corresponding to method steps 252 and 253 are not illustrated. As discussed, the example of FIG. 2J uses the indexes 281-284 shown in FIG. 2I and the data package 218 shown in FIGS. 2B, 2F, and 2J.

In process step 285b (which corresponds to method step 254), the decision parameters affected by the specified values of the input parameters are identified using the indexes 281-284, and non-default values are assigned to those decision parameters. In the example of FIG. 2J, the indexes 281-284 contain five entries corresponding to the specified values of the input parameters: entries 281a, 281c, and 281d (corresponding to the "jeans," "sweatshirt," and "sweater" values of the 'clean_clothes' parameter), entry 283a (corresponding to the "party" value of the 'events_tonight' parameter), and entry 284a (corresponding to the "warm" value of the 'weather' parameter). Collectively, these index entries indicate that the following decision parameters are affected by the input values in the data package: counter[0] (the counter for root node 271), counter [1] (the counter for node 272), counter[4] (the counter for node 277), counter[2] (the counter for node 274), and blacklist[1] (the blacklist flag for node 272). Accordingly, the values of those five decision parameters are set to the appropriate non-default value in process step 285b. In particular, counter[0] is incremented once (for the "jeans" value of the 'clean_clothes' parameter), counter[1] is incremented once (for the "sweatshirt" value of the 'clean_clothes' parameter), counter[2] is incremented once (for the "party" value of the 'events_tonight' parameter), counter[4] is incremented once (for the "sweater" value of the 'clean_clothes' parameter), and blacklist[1] is set to TRUE (for the "warm" value of the 'weather' parameter).

In process steps 285c-285g (which correspond to method step 257), the decision network 270 is analyzed. In the example of FIG. 2J, the predicate evaluation sub-step and the decision determination sub-step are coupled. In the first step 285c of the analysis, the root node 271 of the decision network 270 is visited, the predicate of the root node 271 is determined to be FALSE (because the value of the condition |counter[0]==2| is FALSE), and node 272 is identified as the selected child node. In the second step 285d of the analysis, node 272 is visited, the predicate of node 272 is determined to be FALSE (because the value of the condition |NOT blacklist[1]| is FALSE), and node 274 is identified as the selected child node. In the third step 285e of the analysis, node 274 is visited, the predicate of node 274 is determined to be TRUE (because the conditions |counter[2]==1| and |NOT blacklist[2]| are both TRUE), and node 277 is identified as the selected child node. In the fourth step 285f of the analysis, node 277 is visited, the predicate of node 277 is determined to be TRUE (because the condition |counter [4]==1| and |NOT blacklist[4]| are both TRUE), and node 279 is identified as the selected child node. In the fifth step 285g of the analysis, node 279 is visited and is identified as the output node for the decision tree. Thus, the decision to wear leggings and a sweater is selected.

FIG. 2K depicts another illustrative embodiment of a method 290 for determining the output of a decision network 270 using the method 250 of FIG. 2D and the indexes 281-284 of FIG. 2I in accordance with various aspects described herein. In the example of FIG. 2K, the data package 230 specifying the values of the input parameters is the same as the data package 230 used in the examples of FIGS. 2C and 2G.

In process step 290a (which corresponds to method step 251), the values of the decision parameters are initialized to their default values. For decision network 270, the decision parameters are the counters and blacklist flags. In the example of FIG. 2K, the default value of each counter is zero, the counters are incrementing counters, and the default value of each blacklist flag is FALSE.

In process step 290b (which corresponds to method step 254), the decision parameters affected by the specified values of the input parameters are identified using the indexes 281-284, and non-default values are assigned to those decision parameters. In the example of FIG. 2K, the indexes 281-284 contain five entries corresponding to the specified values of the input parameters: entries 281a, 281b, and 281d (corresponding to the "jeans," "t-shirt," and "sweater values" of the 'clean_clothes' parameter), entries 282a and 282b (corresponding to the "physics" value of the 'tests_today' parameter), and entry 283a (corresponding to the "party" value of the 'events_tonight' parameter). Collectively, these index entries indicate that the following parameters are affected by the input values in the data package: counter[0] (the counter for root node 271), counter [4] (the counter for node 277), blacklist[2] (the blacklist flag for node 274), and counter[2] (the counter for node 274). Accordingly, the values of those four decision parameters are set to the appropriate non-default value in process step 290b. In particular, counter[0] is incremented twice (once each for the "jeans" and "t-shirt" values of the 'clean_ clothes' parameter), counter[4] is incremented once (for the "sweater" value of the 'clean_clothes' parameter), blacklist [2] is set to TRUE (for the "physics" value of the 'tests_today' parameter), and counter[2] is incremented once (for the "party" value of the 'events_tonight' parameter).

In process steps 290c-290d (which correspond to method step 257), the decision network 270 is analyzed. In the example of FIG. 2K, the predicate evaluation sub-step and the decision determination sub-step are coupled. In the first step 290c of the analysis, the root node 271 of the decision network 270 is visited, the predicate of the root node 271 is determined to be TRUE (because the conditions |counter[0] '2=2| and |NOT blacklist[0]| are both TRUE), and node 273 is identified as the selected child node. In the second step 290d of the analysis, node 273 is visited and is identified as the output node for the decision tree. Thus, the decision to wear jeans and a t-shirt is selected.

As the examples of FIGS. 2J and 2K illustrate, collapsing the decision parameters of a decision network into counters and blacklist flags can reduce the amount of memory used to store the predicates and reduce the amount of computation used to evaluate the predicates, which can improve the efficiency and increase the speed of the process of evaluating the decision network. In addition, using the counter-and-blacklist data structure can shift some of the computation involved in evaluating the decision network's predicates from step 257 of the method 250 to step 254 of the method 250, thereby exposing additional parallelism if the decision parameters are evaluated in parallel (e.g., step 254) but the predicates are evaluated serially as the nodes of the decision tree are visited (e.g., in step 257).

Techniques for fast and/or efficient processing of decision networks have been described. These techniques may be used to improve the speed and/or efficiency of decision-making processes in any suitable system or technical field, including but not limited to classification systems, predictive analytics (e.g., systems in which predictive models predict one or more outputs of a modeled system based on one or more inputs to the system), operations research (e.g., to identify a strategy for reaching a goal), operations management (e.g., business management, customer relationship management, fraud detection, etc.), healthcare management (e.g., preventing, diagnosing, treating, and managing illness), analysis and prediction of energy consumption, fault diagnosis (e.g., in machinery), data mining, and automated bidding (e.g., for ad spaces in an Internet-based advertising system). For example, in classification systems, classification decision rules can be represented by paths from a root decision node to a terminal node of a decision network, and the terminal node of a path representing a decision rule can represent a class label assigned to an input. Other applications of the techniques described herein are possible.

While for purposes of simplicity of explanation, the respective processes are shown and described as a series of blocks in FIGS. 2D, 2F, 2G, 2J and 2K, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Some embodiments of the devices, methods and/or operations described in the present disclosure can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on a computer storage medium for execution by, or to control the operation of, data processing apparatus.

Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

Some embodiments of the methods and operations described in the present disclosure can be implemented as operations performed by a data processing apparatus on data stored on one or more computer-readable storage devices or received from other sources.

The phrase "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, for example web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some embodiments of the processes and logic flows described in this specification can be performed by one or more programmable processors executing one or more computer programs to perform actions by operating on input data and generating output. Some embodiments of the processes and logic flows described herein can be performed by, and some embodiments of the apparatus described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both, as explained in more detail below.

Figure 3:
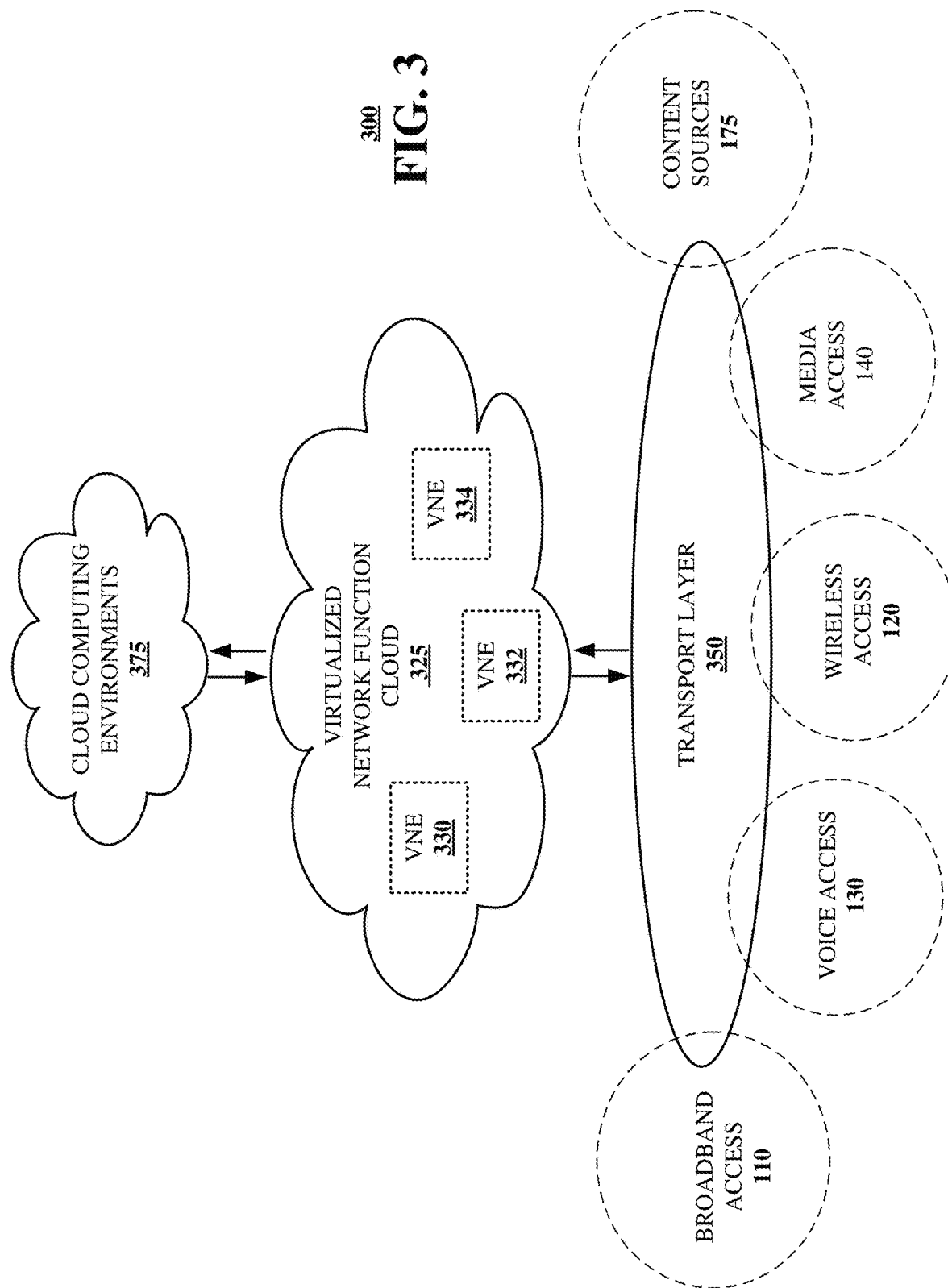
FIG. 3 is a block diagram illustrating an example, non-limiting embodiment of a virtualized communication network in accordance with various aspects described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of communication network 100, the subsystems and functions of methods 250, 265, 266, 285 and 290 presented in FIGS. 1, 2D, 2F, 2G, 2J and 2K, and 3. For example, virtualized communication network 300 can facilitate in whole or in part delivering indexes, data packages specifying one or more first values of the input parameter for a decision network, evaluating decision parameters affected by the first values, analyzing the decision network or providing the respective output of the decision network.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc.

For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
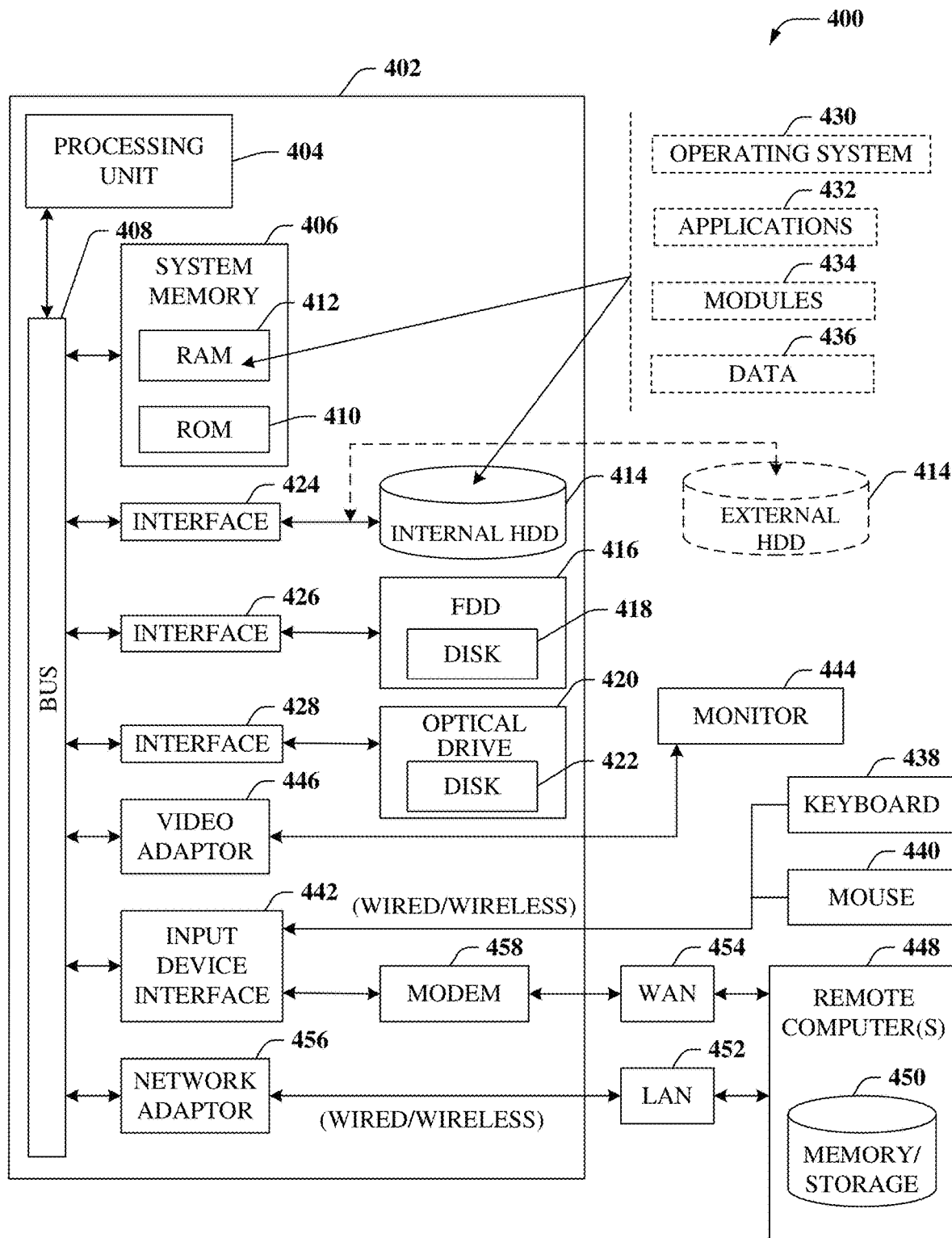
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part creating an index mapping potential values of an input parameter to decision parameters of predicates, evaluating data packages specifying one or more first values of the input parameter for a decision network, evaluating decision parameters affected by the first values, analyzing the decision network or providing the respective output of the decision network.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10 BaseT wired Ethernet networks used in many offices.

Figure 5:
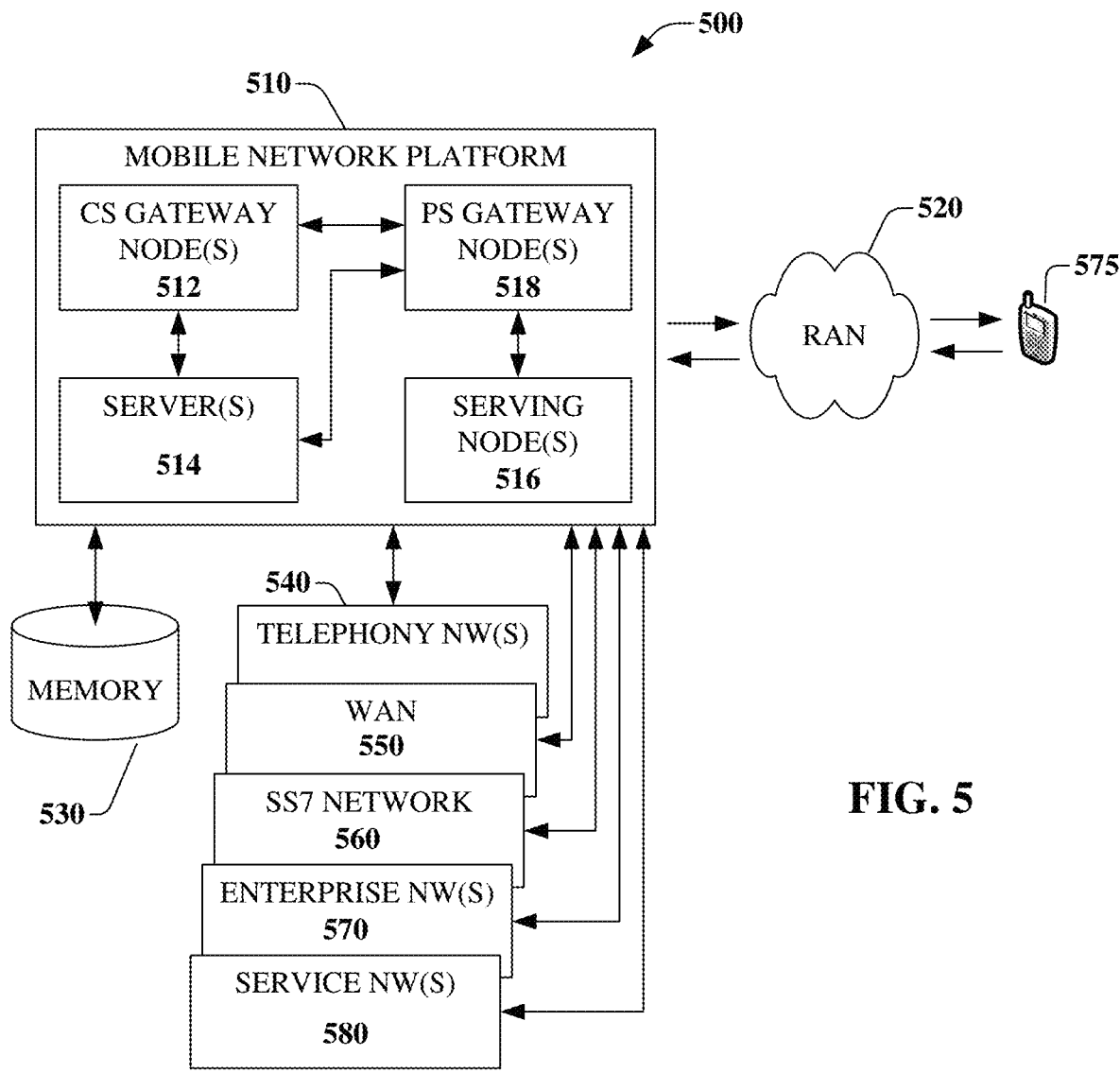
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part creating an index mapping potential values of an input parameter to decision parameters of predicates, evaluating data packages specifying one or more first values of the input parameter for a decision network, evaluating decision parameters affected by the first values, analyzing the decision network or providing the respective output of the decision network. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
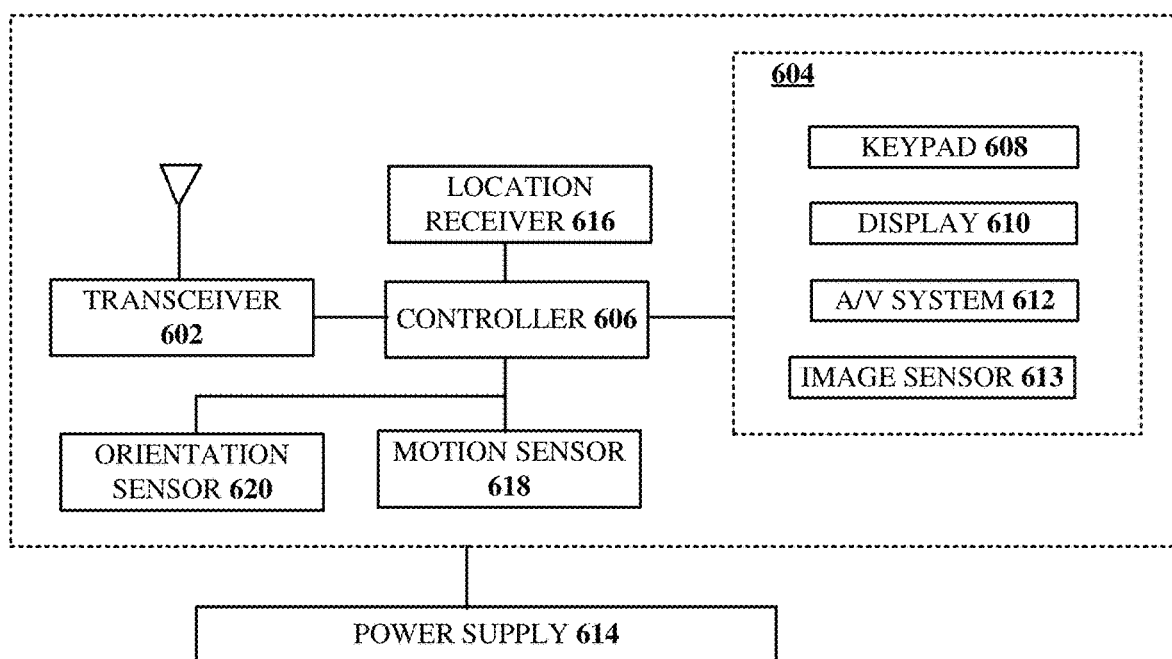
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part creating an index mapping potential values of an input parameter to decision parameters of predicates, evaluating data packages specifying one or more first values of the input parameter for a decision network, evaluating decision parameters affected by the first values, analyzing the decision network or providing the respective output of the decision network.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x_1, x_2, x_3, x_4 \ldots x_n)$, to a confidence that the input belongs to a class, that is, $f(x)$ =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A method, comprising:
    obtaining, by a processing system including a processor, an index encoding a selective mapping from potential values of an input parameter to decision parameters of predicates for respective decision nodes of a decision network, wherein the decision network comprises decision nodes encoding the predicates having respective decision parameters and terminal nodes encoding respective outputs, wherein the selective mapping associates each of a plurality of potential values of the input parameter with the decision parameters affected by the potential values of the input parameter, wherein the index is an inverted index, wherein the potential values of the input parameter are categorical values, wherein the inverted index is indexed by the categorical values of the input parameter, and wherein the inverted index stores, for each categorical value of the input parameter referenced by one or more decision parameters of one or more predicates of the decision network, data identifying the decision parameters affected by a respective categorical value of the input parameter;
    initializing, by the processing system, values of the decision parameters of the predicates for the respective decision nodes of the decision network to default values;
    obtaining, by the processing system, a data package specifying one or more first values of the input parameter;
    evaluating, by the processing system, a first group of the decision parameters that are affected by the one or more first values of the input parameter, wherein the evaluating of the first group of the decision parameters includes:
        identifying each decision parameter mapped to by at least one of the first values of the input parameter by the index, resulting in identified decision parameters, and
        setting values of the identified decision parameters in accordance with the first values of the input parameter; and
    subsequent to the evaluating the first group of the decision parameters, analyzing, by the processing system, the decision network, wherein the analyzing includes:
        evaluating the predicates of the first group of one or more of the decision nodes in the decision network based on the values of the respective decision parameters of the predicates, resulting in evaluated predicates, and
        determining, based on values of the evaluated predicates and a topology of the decision network, that a particular terminal node encodes the respective output of the decision network for the data package, wherein the first group of one or more of the decision nodes includes decision nodes forming a path from a root node of the decision network to the particular terminal node of the decision network.

2. The method of claim 1, wherein the categorical values comprise integer values.

3. The method of claim 1, wherein obtaining the index comprises generating the index before obtaining the data package.

4. The method of claim 1, wherein the predicates include a first predicate representing a conditional expression comprising a conjunction of two or more conditions.

5. The method of claim 4, wherein the conditional expression includes a plurality of positive conditions, wherein a first decision parameter of the first predicate is a counter, and wherein a value of the counter indicates how many of the positive conditions are true.

6. The method of claim 5, wherein the default value of the first decision parameter is a total number of positive conditions minus one.

7. The method of claim 6, wherein the first decision parameter is included in the first group of the decision parameters, and wherein setting the value of the first decision parameter in accordance with the first values of the input parameter comprises decrementing the counter.

8. The method of claim 7, wherein the first predicate corresponds to a node included in the first group of the decision nodes, and wherein evaluating the first predicate comprises determining whether the value of the first decision parameter is negative.

9. The method of claim 5, wherein the default value of the first decision parameter is zero, and wherein the first decision parameter is included in the first group of the decision parameters, and wherein setting the value of the first decision parameter in accordance with the first values of the input parameter comprises incrementing the counter.

10. A non-transitory, machine-readable medium, comprising executable instructions that, when executed by a processing system including a processor, facilitate performance of operations, the operations comprising:
    obtaining an index encoding a selective mapping from potential values of an input parameter to decision parameters of predicates of a plurality of decision networks, wherein each of the decision networks in the plurality of decision networks includes decision nodes and terminal nodes, wherein the decision nodes encode the predicates, wherein the predicates have the decision parameters, wherein the terminal nodes encode respective outputs, and wherein the selective mapping associates each of a plurality of potential values of the input parameter with the decision parameters of each decision network that have respective values that are affected by the potential values of the input parameter;
initializing values of the decision parameters of each decision network to default values;
receiving a data package specifying one or more first values of the input parameter;
evaluating a first group of the decision parameters affected by the first values of the input parameter, wherein evaluating the first group of the decision parameters includes:
identifying each decision parameter of each decision network to which the index maps at least one of the first values of the input parameter, resulting in identified decision parameters, and
setting values of the identified decision parameters in accordance with the first values of the input parameter; and
subsequent to the evaluating the first group of the decision parameters, analyzing each decision network, including:
evaluating the predicates of the first group of one or more of the decision nodes based on the values of the decision parameters of the respective predicates, resulting in evaluated predicates, wherein the predicates include a first predicate representing a conditional expression comprising a conjunction of two or more conditions, wherein the conditional expression includes a plurality of positive conditions, wherein a first decision parameter of the first predicate is a counter, wherein a value of the counter indicates how many of the positive conditions are true, wherein the default value of the first decision parameter is a total number of positive conditions minus one, wherein the first decision parameter is included in the first group of the decision parameters, wherein setting the value of the first decision parameter in accordance with the first values of the input parameter comprises decrementing the counter, and wherein the first predicate corresponds to a node included in the first group of the decision nodes, and wherein evaluating the first predicate comprises determining whether the value of the first decision parameter is negative, and
determining, based on values of the evaluated predicates and a topology of the decision network, that a particular terminal node encodes a respective output of the decision network for the data package.

11. The non-transitory, machine-readable medium of claim 10, wherein the conditions include at least one negative condition, wherein a second decision parameter of the first predicate is a Boolean flag, wherein a value of the Boolean flag indicates whether at least one of the negative conditions is unsatisfied, wherein the default value of the Boolean flag indicates that all of the negative conditions are satisfied, wherein the second decision parameter is included in the first group of the decision parameters, wherein setting the value of the second decision parameter in accordance with the first values of the input parameter comprises setting the value of the Boolean flag to true, wherein the first predicate corresponds to a node included in the first group of the decision nodes, and wherein the first predicate is satisfied if the value of the counter indicates that each of the positive conditions is true and the value of the Boolean flag is false.

12. A device, comprising:
a processing system including a processor; and
a memory that stores executable instructions that, when executed by the processing system, facilitate performance of operations, the operations comprising:
indexing a selective mapping from potential values of an input parameter to decision parameters of predicates for respective decision nodes of a decision network, wherein the decision network comprises decision nodes encoding the predicates having respective decision parameters and terminal nodes encoding respective outputs, wherein the selective mapping associates each of a plurality of potential values of the input parameter with the decision parameters affected by the potential values of the input parameter, wherein the index is an interval index, wherein the potential values of the input parameter are numeric values within a predetermined range, wherein the interval index divides the predetermined range into a plurality of intervals, wherein each of the intervals corresponds to an individual numeric value within the predetermined range or a subrange of numeric values within the predetermined range, and wherein the interval index associates each of the intervals with all the decision parameters affected by one or more numeric values of the input parameter within the interval;
initializing values of the decision parameters of the predicates for the respective decision nodes of the decision network to default values;
receiving a data package specifying one or more first values of the input parameter;
evaluating a first group of the decision parameters that are affected by the one or more first values of the input parameter, wherein the evaluating of the first group of the decision parameters includes:
identifying each decision parameter from the selective mapping to at least one of the first values of the input parameter, resulting in identified decision parameters, and
setting values of the identified decision parameters in accordance with the first values of the input parameter; and
analyzing the decision network to discover a particular terminal node, wherein the analyzing includes:
evaluating the predicates of the first group of one or more of the decision nodes in the decision network based on the values of the respective decision parameters of the predicates, resulting in evaluated predicates, and
determining, based on values of the evaluated predicates and a topology of the decision network, that the particular terminal node encodes a respective output of the decision network for the data package, wherein the first group of one or more of the decision nodes includes decision nodes forming a path from a root node of the decision network to the particular terminal node of the decision network.

13. The device of claim 12, wherein the processing system comprises a plurality of processors operating in a distributed computing environment.

14. The device of claim 12, wherein the plurality of intervals is mutually non-overlapping.

15. The device of claim 12, wherein at least two intervals of the plurality of intervals partially overlap or fully overlap.

16. The device of claim 12, wherein the indexing is performed before obtaining the data package.

17. The device of claim 12, wherein the predicates include a first predicate representing a conditional expression comprising a conjunction of two or more conditions.

18. The device of claim 17, wherein the conditional expression includes a plurality of positive conditions, wherein a first decision parameter of the first predicate is a counter, and wherein a value of the counter indicates how many of the positive conditions are true.

19. The device of claim 18, wherein a default value of the first decision parameter is a total number of positive conditions minus one.

20. The device of claim 19, wherein the first decision parameter is included in the first group of the decision parameters, and wherein setting the value of the first decision parameter in accordance with the first values of the input parameter comprises decrementing the counter.

\* \* \* \* \*